United States Patent
Srinivasan et al.

(10) Patent No.: US 10,469,901 B2
(45) Date of Patent: *Nov. 5, 2019

(54) METHODS AND APPARATUS TO VERIFY PRESENTATION OF MEDIA CONTENT

(71) Applicant: The Nielsen Company (US), LLC, New York, NY (US)

(72) Inventors: Venugopal Srinivasan, Palm Harbor, FL (US); Arun Ramaswamy, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/841,191

(22) Filed: Aug. 31, 2015

(65) Prior Publication Data
US 2015/0373406 A1    Dec. 24, 2015

Related U.S. Application Data

(63) Continuation of application No. 12/505,966, filed on Jul. 20, 2009, now Pat. No. 9,124,769.
(Continued)

(51) Int. Cl.
   *H04N 21/442*    (2011.01)
   *H04N 21/466*    (2011.01)
   (Continued)

(52) U.S. Cl.
   CPC ... *H04N 21/44204* (2013.01); *G06F 21/6245* (2013.01); *H04H 60/31* (2013.01);
   (Continued)

(58) Field of Classification Search
   CPC ............... G06F 21/6245; H04H 60/31; H04N 21/42203; H04N 21/43615;
   (Continued)

(56) References Cited

U.S. PATENT DOCUMENTS

| | | |
|---|---|---|
| 2,573,279 A | 10/1951 | Scherbatskoy |
| 2,903,508 A | 9/1959 | Hathaway |

(Continued)

FOREIGN PATENT DOCUMENTS

| | | |
|---|---|---|
| AU | 2005251196 | 12/2005 |
| CA | 1318967 | 6/1993 |

(Continued)

OTHER PUBLICATIONS

Advanced Television Systems Committee T3/S8 Transport Specialist Group, "Annex G—An Overview of PSIP for Cable," ATSC T3/S8, Doc. 268, Apr. 3, 1998 (5 pages).

(Continued)

*Primary Examiner* — Rong Le
(74) *Attorney, Agent, or Firm* — Hanley Flight & Zimmerman, LLC

(57) ABSTRACT

Example methods and apparatus to verify presentation of media content are disclosed. A disclosed example apparatus for generating media presentation information includes a comparator to periodically output a value indicative of whether media selected via a set-top box is presented at a media presentation location by comparing a first audio signal associated with the media to ambient audio received in the media presentation location via an audio system associated with a media presentation device. The example apparatus also includes a privacy protector to facilitate operation of the comparator by periodically preventing the comparator from receiving of the ambient audio. The example apparatus also includes a metering module to record presentation of the media based on the output.

17 Claims, 7 Drawing Sheets

Related U.S. Application Data

(60) Provisional application No. 61/110,274, filed on Oct. 31, 2008.

(51) Int. Cl.
| | |
|---|---|
| *H04N 21/439* | (2011.01) |
| *G06F 21/62* | (2013.01) |
| *H04N 21/422* | (2011.01) |
| *H04H 60/31* | (2008.01) |
| *H04N 7/16* | (2011.01) |
| *H04N 21/436* | (2011.01) |

(52) U.S. Cl.
CPC ....... *H04N 7/163* (2013.01); *H04N 21/42203* (2013.01); *H04N 21/4394* (2013.01); *H04N 21/4396* (2013.01); *H04N 21/43615* (2013.01); *H04N 21/44213* (2013.01); *H04N 21/4667* (2013.01)

(58) Field of Classification Search
CPC ........... H04N 21/4394; H04N 21/4396; H04N 21/44204; H04N 21/44213; H04N 21/4667; H04N 7/163
See application file for complete search history.

(56) References Cited

U.S. PATENT DOCUMENTS

| | | |
|---|---|---|
| 3,004,104 A | 10/1961 | Hembrooke |
| 3,372,233 A | 3/1968 | Currey |
| 3,540,003 A | 11/1970 | Murphy |
| 3,594,507 A | 7/1971 | Clark, III |
| 3,810,156 A | 5/1974 | Goldman |
| 3,818,458 A | 6/1974 | Deese |
| 3,845,391 A | 10/1974 | Crosby |
| 3,879,581 A | 4/1975 | Schlosser et al. |
| 3,881,153 A | 4/1975 | Harzer |
| 3,906,450 A | 9/1975 | Prado, Jr. |
| 3,906,454 A | 9/1975 | Martin |
| 3,919,479 A | 11/1975 | Moon et al. |
| 4,025,851 A | 5/1977 | Haselwood et al. |
| 4,027,332 A | 5/1977 | Wu et al. |
| 4,052,720 A * | 10/1977 | McGregor ......... G08B 13/1672 340/522 |
| 4,060,695 A | 11/1977 | Suzuki et al. |
| 4,160,875 A * | 7/1979 | Kahn ................. G08B 13/1672 340/6.1 |
| 4,230,990 A | 10/1980 | Lert, Jr. et al. |
| 4,283,601 A | 8/1981 | Nakajima et al. |
| 4,449,189 A | 5/1984 | Feix et al. |
| 4,455,634 A | 6/1984 | Efron et al. |
| 4,511,917 A | 4/1985 | Kohler et al. |
| 4,547,804 A | 10/1985 | Greenberg |
| 4,574,304 A | 3/1986 | Watanabe et al. |
| 4,590,550 A | 5/1986 | Eilert et al. |
| 4,595,950 A | 6/1986 | Lofberg |
| 4,599,644 A | 7/1986 | Fischer |
| 4,606,069 A | 8/1986 | Johnsen |
| 4,622,583 A | 11/1986 | Watanabe et al. |
| 4,630,196 A | 12/1986 | Bednar, Jr. et al. |
| 4,633,302 A | 12/1986 | Damoci |
| 4,639,779 A | 1/1987 | Greenberg |
| 4,644,509 A | 2/1987 | Kiewit et al. |
| 4,647,974 A | 3/1987 | Butler et al. |
| 4,654,835 A | 3/1987 | Feintuch |
| 4,677,466 A | 6/1987 | Lert, Jr. et al. |
| 4,696,034 A | 9/1987 | Wiedemer |
| 4,697,209 A | 9/1987 | Kiewit et al. |
| 4,703,324 A | 10/1987 | White |
| 4,712,097 A | 12/1987 | Hashimoto |
| 4,718,005 A | 1/1988 | Feigenbaum et al. |
| 4,718,106 A | 1/1988 | Weinblatt |
| 4,720,782 A | 1/1988 | Kovalcin |
| 4,723,302 A | 2/1988 | Fulmer et al. |
| 4,734,865 A | 3/1988 | Scullion et al. |
| 4,739,398 A | 4/1988 | Thomas et al. |
| 4,740,890 A | 4/1988 | William |
| 4,745,468 A | 5/1988 | Von Kohorn |
| 4,747,139 A | 5/1988 | Taaffe |
| 4,750,034 A | 6/1988 | Lem |
| 4,754,262 A | 6/1988 | Hackett et al. |
| 4,764,808 A | 8/1988 | Solar |
| 4,769,697 A | 9/1988 | Gilley et al. |
| 4,792,864 A | 12/1988 | Watanabe et al. |
| 4,816,904 A | 3/1989 | McKenna et al. |
| 4,821,178 A | 4/1989 | Levin et al. |
| 4,839,919 A | 6/1989 | Borges et al. |
| 4,843,562 A | 6/1989 | Kenyon et al. |
| 4,847,685 A | 7/1989 | Gall et al. |
| 4,856,067 A | 8/1989 | Yamada et al. |
| 4,858,000 A | 8/1989 | Lu |
| 4,876,592 A | 10/1989 | Von Kohorn |
| 4,876,617 A | 10/1989 | Best et al. |
| 4,885,632 A | 12/1989 | Mabey et al. |
| 4,907,079 A | 3/1990 | Turner et al. |
| 4,918,730 A | 4/1990 | Schulze |
| 4,926,162 A | 5/1990 | Pickell |
| 4,926,255 A | 5/1990 | Von Kohorn |
| 4,931,871 A | 6/1990 | Kramer |
| 4,945,412 A | 6/1990 | Kramer |
| 4,943,963 A | 7/1990 | Waechter et al. |
| 4,947,436 A | 8/1990 | Greaves et al. |
| 4,955,070 A | 9/1990 | Welsh et al. |
| 4,965,825 A | 10/1990 | Harvey et al. |
| 4,972,503 A | 11/1990 | Zurlinden |
| 5,003,591 A | 3/1991 | Kauffman et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,087,977 A | 2/1992 | Suizu |
| 5,103,498 A | 4/1992 | Lanier et al. |
| 5,113,437 A | 5/1992 | Best et al. |
| 5,128,752 A | 7/1992 | Von Kohorn |
| 5,138,659 A | 8/1992 | Kelkar et al. |
| 5,155,762 A | 10/1992 | Croquet et al. |
| 5,165,069 A | 11/1992 | Vitt et al. |
| 5,200,822 A | 4/1993 | Bronfin et al. |
| 5,229,764 A | 7/1993 | Matchett et al. |
| 5,250,745 A | 10/1993 | Tsumura |
| 5,251,324 A | 10/1993 | McMullan, Jr. |
| 5,267,323 A | 11/1993 | Kimura |
| 5,278,988 A | 1/1994 | Dejean et al. |
| 5,283,734 A | 2/1994 | Von Kohorn |
| 5,294,977 A | 3/1994 | Fisher et al. |
| 5,317,635 A | 5/1994 | Stirling et al. |
| 5,319,453 A | 6/1994 | Copriviza et al. |
| 5,341,216 A | 8/1994 | Hoffart |
| 5,343,239 A | 8/1994 | Lappington et al. |
| 5,355,161 A | 10/1994 | Bird et al. |
| 5,369,440 A | 11/1994 | Sussman |
| 5,373,315 A | 12/1994 | Dufresne et al. |
| 5,374,951 A | 12/1994 | Welsh |
| 5,379,345 A | 1/1995 | Greenberg |
| 5,388,211 A | 2/1995 | Hornbuckle |
| 5,404,160 A | 4/1995 | Schober et al. |
| 5,404,161 A | 4/1995 | Douglass et al. |
| 5,404,377 A | 4/1995 | Moses |
| 5,406,269 A | 4/1995 | Baran |
| 5,412,738 A | 5/1995 | Brunelli et al. |
| 5,425,100 A | 6/1995 | Thomas et al. |
| 5,436,653 A | 7/1995 | Ellis et al. |
| 5,437,050 A | 7/1995 | Lamb et al. |
| 5,450,122 A | 9/1995 | Keene |
| 5,450,134 A | 9/1995 | Legate |
| 5,450,490 A | 9/1995 | Jensen et al. |
| 5,457,807 A | 10/1995 | Weinblatt |
| 5,463,616 A | 10/1995 | Kruse et al. |
| 5,481,294 A | 1/1996 | Thomas et al. |
| 5,481,296 A | 1/1996 | Cragun et al. |
| 5,485,518 A | 1/1996 | Hunter et al. |
| 5,488,408 A | 1/1996 | Maduzia et al. |
| 5,488,648 A | 1/1996 | Womble |

(56) References Cited

U.S. PATENT DOCUMENTS

| | | | |
|---|---|---|---|
| 5,495,282 | A | 2/1996 | Mostafa et al. |
| 5,497,185 | A | 3/1996 | Dufresne et al. |
| 5,497,479 | A | 3/1996 | Hornbuckle |
| 5,504,518 | A | 4/1996 | Ellis et al. |
| 5,508,731 | A | 4/1996 | Kohorn |
| 5,512,933 | A | 4/1996 | Wheatley et al. |
| 5,519,433 | A | 5/1996 | Lappington et al. |
| 5,521,631 | A | 5/1996 | Budow et al. |
| 5,526,035 | A | 6/1996 | Lappington et al. |
| 5,526,427 | A | 6/1996 | Thomas et al. |
| 5,532,732 | A | 7/1996 | Yuen et al. |
| 5,533,021 | A | 7/1996 | Branstad et al. |
| 5,535,209 | A | 7/1996 | Glaser et al. |
| 5,539,822 | A | 7/1996 | Lett |
| 5,543,856 | A | 8/1996 | Rosser et al. |
| 5,544,164 | A * | 8/1996 | Baran .................. H04L 49/255 370/397 |
| 5,557,334 | A | 9/1996 | Legate |
| 5,559,549 | A | 9/1996 | Hendricks et al. |
| 5,559,808 | A | 9/1996 | Kostreski et al. |
| 5,561,010 | A | 10/1996 | Hanyu et al. |
| 5,572,246 | A | 11/1996 | Ellis et al. |
| 5,574,962 | A | 11/1996 | Fardeau et al. |
| 5,579,124 | A | 11/1996 | Aijala et al. |
| 5,581,658 | A | 12/1996 | O'Hagan et al. |
| 5,581,800 | A | 12/1996 | Fardeau et al. |
| 5,583,784 | A | 12/1996 | Kapust et al. |
| 5,584,025 | A | 12/1996 | Keithley et al. |
| 5,584,050 | A | 12/1996 | Lyons |
| 5,592,548 | A | 1/1997 | Sih |
| 5,594,934 | A * | 1/1997 | Lu ........................ H04H 60/372 455/2.01 |
| 5,600,364 | A | 2/1997 | Hendricks et al. |
| 5,606,604 | A | 2/1997 | Rosenblatt et al. |
| 5,608,445 | A | 3/1997 | Mischler |
| 5,610,653 | A | 3/1997 | Abecassis |
| 5,610,916 | A | 3/1997 | Kostreski et al. |
| 5,611,019 | A | 3/1997 | Nakatoh et al. |
| 5,612,729 | A | 3/1997 | Ellis et al. |
| 5,615,296 | A | 3/1997 | Stanford et al. |
| 5,621,395 | A | 4/1997 | Kiyaji et al. |
| 5,621,454 | A | 4/1997 | Ellis et al. |
| 5,629,739 | A | 5/1997 | Dougherty |
| 5,630,203 | A | 5/1997 | Weinblatt |
| 5,636,346 | A | 6/1997 | Saxe |
| 5,638,113 | A | 6/1997 | Lappington et al. |
| 5,640,192 | A | 6/1997 | Garfinkle |
| 5,646,675 | A | 7/1997 | Copriviza et al. |
| 5,646,942 | A | 7/1997 | Oliver et al. |
| 5,654,748 | A | 8/1997 | Matthews, III |
| 5,659,350 | A | 8/1997 | Hendricks et al. |
| 5,666,365 | A | 9/1997 | Kostreski |
| 5,697,844 | A | 12/1997 | Von Kohorn |
| 5,699,276 | A | 12/1997 | Roos |
| 5,701,582 | A | 12/1997 | Debey |
| 5,713,795 | A | 2/1998 | Kohorn |
| 5,724,103 | A | 3/1998 | Batchelor |
| 5,724,521 | A | 3/1998 | Dedrick |
| 5,726,701 | A | 3/1998 | Needham |
| 5,729,549 | A | 3/1998 | Kostreski et al. |
| 5,734,413 | A | 3/1998 | Lappington et al. |
| 5,734,444 | A | 3/1998 | Yoshinobu |
| 5,734,720 | A | 3/1998 | Salganicoff |
| 5,736,927 | A * | 4/1998 | Stebbins ................ G08B 29/26 340/3.32 |
| 5,737,025 | A | 4/1998 | Dougherty et al. |
| 5,751,707 | A | 5/1998 | Voit et al. |
| 5,757,414 | A | 5/1998 | Thorne |
| 5,758,257 | A | 5/1998 | Herz et al. |
| 5,759,101 | A | 6/1998 | Von Kohorn |
| 5,761,606 | A | 6/1998 | Wolzien |
| 5,764,275 | A | 6/1998 | Lappington et al. |
| 5,764,763 | A | 6/1998 | Jensen et al. |
| 5,765,130 | A | 6/1998 | Nguyen |
| 5,767,893 | A | 6/1998 | Chen et al. |
| 5,768,680 | A | 6/1998 | Thomas |
| 5,771,307 | A | 6/1998 | Lu et al. |
| 5,774,564 | A | 6/1998 | Eguchi et al. |
| 5,774,664 | A | 6/1998 | Hidary et al. |
| 5,774,859 | A | 6/1998 | Houser et al. |
| 5,787,334 | A | 7/1998 | Fardeau et al. |
| 5,793,410 | A | 8/1998 | Rao |
| 5,793,414 | A | 8/1998 | Shaffer |
| 5,798,785 | A | 8/1998 | Hendricks et al. |
| 5,799,092 | A | 8/1998 | Kristol et al. |
| 5,802,304 | A | 9/1998 | Stone |
| 5,809,041 | A | 9/1998 | Shikakura et al. |
| 5,809,160 | A | 9/1998 | Powell et al. |
| 5,812,928 | A | 9/1998 | Watson, Jr. et al. |
| 5,815,297 | A | 9/1998 | Ciciora |
| 5,815,671 | A | 9/1998 | Morrison |
| 5,819,156 | A | 10/1998 | Belmont |
| 5,826,164 | A | 10/1998 | Weinblatt |
| 5,832,223 | A | 11/1998 | Hara et al. |
| 5,833,468 | A | 11/1998 | Guy et al. |
| 5,842,010 | A | 11/1998 | Jain et al. |
| 5,850,249 | A | 12/1998 | Massetti et al. |
| 5,870,754 | A | 2/1999 | Dimitrova et al. |
| 5,872,588 | A | 2/1999 | Aras et al. |
| 5,878,384 | A | 3/1999 | Johnson et al. |
| 5,880,789 | A | 3/1999 | Inaba |
| 5,881,360 | A | 3/1999 | Fong |
| 5,887,140 | A | 3/1999 | Itsumi et al. |
| 5,889,548 | A | 3/1999 | Chan |
| 5,905,713 | A | 5/1999 | Anderson et al. |
| 5,905,865 | A | 5/1999 | Palmer et al. |
| 5,907,366 | A | 5/1999 | Farmer et al. |
| 5,910,988 | A | 6/1999 | Ballard |
| 5,914,746 | A | 6/1999 | Matthews, III et al. |
| 5,945,988 | A | 8/1999 | Williams et al. |
| 5,946,050 | A | 8/1999 | Wolff |
| 5,951,642 | A | 9/1999 | Onoe et al. |
| 5,956,716 | A | 9/1999 | Kenner et al. |
| 5,966,120 | A | 10/1999 | Arazi et al. |
| 5,973,625 | A | 10/1999 | Nam |
| 5,973,750 | A | 10/1999 | Ogawa et al. |
| 5,974,299 | A | 10/1999 | Massetti |
| 5,982,932 | A | 11/1999 | Prokoski |
| 5,990,927 | A | 11/1999 | Hendricks et al. |
| 5,999,689 | A | 12/1999 | Iggulden |
| 5,999,912 | A | 12/1999 | Wodarz et al. |
| 6,002,393 | A | 12/1999 | Hite et al. |
| 6,002,443 | A | 12/1999 | Iggulden |
| 6,005,561 | A | 12/1999 | Hawkins et al. |
| 6,006,217 | A | 12/1999 | Lumsden |
| 6,025,837 | A | 2/2000 | Matthews, III et al. |
| 6,029,045 | A | 2/2000 | Picco et al. |
| 6,031,577 | A | 2/2000 | Ozkan et al. |
| 6,035,177 | A | 3/2000 | Moses et al. |
| 6,061,082 | A | 5/2000 | Park |
| 6,061,451 | A | 5/2000 | Muratani et al. |
| 6,061,719 | A | 5/2000 | Bendinelli et al. |
| 6,085,066 | A | 7/2000 | Fong |
| 6,088,722 | A | 7/2000 | Herz et al. |
| 6,112,053 | A | 8/2000 | Dunki-Jacobs et al. |
| 6,118,873 | A | 9/2000 | Lotspiech et al. |
| 6,124,877 | A | 9/2000 | Schmidt |
| 6,130,726 | A | 10/2000 | Darbee et al. |
| 6,160,570 | A | 12/2000 | Sitnik |
| 6,161,090 | A | 12/2000 | Kanevsky et al. |
| 6,166,730 | A | 12/2000 | Goode et al. |
| 6,169,843 | B1 | 1/2001 | Lenihan et al. |
| 6,184,918 | B1 | 2/2001 | Goldschmidt Iki et al. |
| 6,189,008 | B1 | 2/2001 | Easty et al. |
| 6,199,206 | B1 | 3/2001 | Nishioka et al. |
| 6,202,210 | B1 | 3/2001 | Ludtke |
| 6,216,265 | B1 | 4/2001 | Roop et al. |
| 6,226,618 | B1 | 5/2001 | Downs et al. |
| 6,259,443 | B1 | 7/2001 | Williams, Jr. |
| 6,286,140 | B1 | 9/2001 | Ivanyi |
| 6,289,514 | B1 | 9/2001 | Link et al. |
| 6,308,327 | B1 | 10/2001 | Liu et al. |
| 6,317,881 | B1 | 11/2001 | Shah-Nazaroff et al. |
| 6,345,389 | B1 | 2/2002 | Dureau |

(56) References Cited

U.S. PATENT DOCUMENTS

| | | | |
|---|---|---|---|
| 6,356,945 B1 | 3/2002 | Shaw et al. | |
| 6,377,682 B1 | 4/2002 | Benesty et al. | |
| 6,405,166 B1 | 6/2002 | Huang et al. | |
| 6,421,445 B1 | 7/2002 | Jensen et al. | |
| 6,467,089 B1 | 10/2002 | Aust et al. | |
| 6,473,903 B2 | 10/2002 | Balakrishnan et al. | |
| 6,477,707 B1 | 11/2002 | King et al. | |
| 6,508,709 B1* | 1/2003 | Karmarkar | G07F 17/32 463/40 |
| 6,510,557 B1 | 1/2003 | Thrift | |
| 6,512,796 B1 | 1/2003 | Sherwood | |
| 6,513,161 B2 | 1/2003 | Wheeler et al. | |
| 6,523,175 B1 | 2/2003 | Chan | |
| 6,542,869 B1 | 4/2003 | Foote | |
| 6,560,349 B1 | 5/2003 | Rhoads | |
| 6,574,594 B2 | 6/2003 | Pitman et al. | |
| 6,647,548 B1 | 11/2003 | Lu et al. | |
| 6,651,043 B2 | 11/2003 | Ammicht et al. | |
| 6,675,383 B1 | 1/2004 | Wheeler et al. | |
| 6,735,775 B1 | 5/2004 | Massetti | |
| 6,738,978 B1 | 5/2004 | Hendricks et al. | |
| 6,983,478 B1 | 1/2006 | Grauch et al. | |
| 7,039,932 B2 | 5/2006 | Eldering | |
| 7,155,159 B1 | 12/2006 | Weinblatt et al. | |
| 7,206,494 B2 | 4/2007 | Engle et al. | |
| 7,239,981 B2 | 7/2007 | Kolessar et al. | |
| 7,316,025 B1 | 1/2008 | Aijala et al. | |
| 7,353,171 B2 | 4/2008 | Srinivasan | |
| 7,421,723 B2 | 9/2008 | Harkness et al. | |
| 7,440,674 B2 | 10/2008 | Plotnick et al. | |
| 7,454,776 B1 | 11/2008 | Walker et al. | |
| 7,523,474 B2 | 4/2009 | Herley | |
| 7,587,728 B2 | 9/2009 | Wheeler et al. | |
| 7,607,147 B1 | 10/2009 | Lu et al. | |
| 7,613,310 B2* | 11/2009 | Mao | G10L 21/0208 367/119 |
| 7,644,422 B2 | 1/2010 | Lu et al. | |
| 7,725,896 B2 | 5/2010 | Pham | |
| 7,752,042 B2 | 7/2010 | Srinivasan | |
| 7,774,807 B2 | 8/2010 | Wheeler et al. | |
| 7,792,540 B2 | 9/2010 | Lee et al. | |
| 7,822,194 B2 | 10/2010 | Marton | |
| 7,958,526 B2 | 6/2011 | Wheeler et al. | |
| 8,434,100 B2 | 4/2013 | Wheeler et al. | |
| 8,565,415 B2 | 10/2013 | Schmidt et al. | |
| 8,671,128 B1 | 3/2014 | Dehghan et al. | |
| 8,732,738 B2 | 5/2014 | Lu et al. | |
| 8,763,022 B2 | 6/2014 | Ramaswamy | |
| 8,776,103 B2 | 7/2014 | Lu et al. | |
| 2001/0023436 A1 | 9/2001 | Srinivasan et al. | |
| 2001/0028662 A1 | 10/2001 | Hunt et al. | |
| 2001/0044751 A1 | 11/2001 | Pugliese, III et al. | |
| 2001/0047517 A1 | 11/2001 | Christopoulos et al. | |
| 2001/0056405 A1 | 12/2001 | Muyres et al. | |
| 2001/0056573 A1 | 12/2001 | Kovac et al. | |
| 2002/0002488 A1 | 1/2002 | Muyres et al. | |
| 2002/0010919 A1 | 1/2002 | Lu et al. | |
| 2002/0019769 A1 | 2/2002 | Barritz et al. | |
| 2002/0026635 A1 | 2/2002 | Wheeler et al. | |
| 2002/0031224 A1 | 3/2002 | Basawapatna et al. | |
| 2002/0032904 A1 | 3/2002 | Lerner | |
| 2002/0044225 A1 | 4/2002 | Rakib | |
| 2002/0053077 A1 | 5/2002 | Shah-Nazaroff et al. | |
| 2002/0053078 A1 | 5/2002 | Holtz et al. | |
| 2002/0056086 A1 | 5/2002 | Yuen | |
| 2002/0056087 A1 | 5/2002 | Berezowski et al. | |
| 2002/0059577 A1 | 5/2002 | Lu | |
| 2002/0059637 A1 | 5/2002 | Rakib | |
| 2002/0065826 A1 | 5/2002 | Bell et al. | |
| 2002/0087969 A1 | 7/2002 | Brunheroto et al. | |
| 2002/0100055 A1 | 7/2002 | Zeidman | |
| 2002/0120925 A1 | 8/2002 | Logan | |
| 2002/0124246 A1 | 9/2002 | Kaminsky et al. | |
| 2002/0129368 A1 | 9/2002 | Schlack et al. | |
| 2002/0144262 A1 | 10/2002 | Plotnick et al. | |
| 2002/0174425 A1 | 11/2002 | Markel et al. | |
| 2002/0190797 A1 | 12/2002 | Deppe et al. | |
| 2002/0194586 A1 | 12/2002 | Gutta et al. | |
| 2002/0194592 A1 | 12/2002 | Tsuchida et al. | |
| 2003/0001880 A1 | 1/2003 | Holtz et al. | |
| 2003/0005430 A1 | 1/2003 | Kolessar | |
| 2003/0005431 A1 | 1/2003 | Shinohara | |
| 2003/0028872 A1 | 2/2003 | Milovanovic et al. | |
| 2003/0037333 A1 | 2/2003 | Ghashghai et al. | |
| 2003/0039465 A1 | 2/2003 | Bjorgan et al. | |
| 2003/0056208 A1 | 3/2003 | Kamada et al. | |
| 2003/0070167 A1 | 4/2003 | Holtz et al. | |
| 2003/0088674 A1 | 5/2003 | Ullman et al. | |
| 2003/0110485 A1 | 6/2003 | Lu et al. | |
| 2003/0110503 A1 | 6/2003 | Perkes | |
| 2003/0112974 A1 | 6/2003 | Levy | |
| 2003/0126593 A1 | 7/2003 | Mault | |
| 2003/0149975 A1 | 8/2003 | Eldering et al. | |
| 2003/0149991 A1 | 8/2003 | Reidhead et al. | |
| 2003/0154128 A1 | 8/2003 | Liga et al. | |
| 2003/0208763 A1 | 11/2003 | McElhatten et al. | |
| 2003/0208767 A1 | 11/2003 | Williamson et al. | |
| 2003/0220705 A1* | 11/2003 | Ibey | H04R 5/04 700/94 |
| 2004/0001137 A1* | 1/2004 | Cutler | H04N 5/2259 348/14.08 |
| 2004/0019463 A1 | 1/2004 | Kolessar et al. | |
| 2004/0019900 A1 | 1/2004 | Knightbridge et al. | |
| 2004/0039914 A1 | 2/2004 | Barr et al. | |
| 2004/0058675 A1 | 3/2004 | Lu et al. | |
| 2004/0073916 A1 | 4/2004 | Petrovic et al. | |
| 2004/0088721 A1 | 5/2004 | Wheeler et al. | |
| 2004/0132481 A1 | 7/2004 | Sugaya | |
| 2004/0192243 A1* | 9/2004 | Siegel | H04M 1/6041 455/296 |
| 2005/0028189 A1 | 2/2005 | Heine et al. | |
| 2005/0033758 A1 | 2/2005 | Baxter | |
| 2005/0069106 A1* | 3/2005 | Perepa | H04M 1/72522 379/93.15 |
| 2005/0071863 A1 | 3/2005 | Matz et al. | |
| 2005/0114141 A1* | 5/2005 | Grody | G10L 15/30 704/270 |
| 2005/0135614 A1 | 6/2005 | Hollar et al. | |
| 2005/0149965 A1 | 7/2005 | Neogi | |
| 2005/0160258 A1 | 7/2005 | O'Shea et al. | |
| 2005/0181722 A1 | 8/2005 | Kopra et al. | |
| 2005/0216509 A1* | 9/2005 | Kolessar | G06Q 30/02 |
| 2005/0267750 A1 | 12/2005 | Steuer et al. | |
| 2006/0100868 A1 | 5/2006 | Hetherington et al. | |
| 2006/0195861 A1 | 8/2006 | Lee | |
| 2006/0200841 A1 | 9/2006 | Ramaswamy et al. | |
| 2006/0203105 A1* | 9/2006 | Srinivasan | G10L 15/20 348/231.4 |
| 2006/0224552 A1 | 10/2006 | Riezler et al. | |
| 2006/0247919 A1* | 11/2006 | Specht | G10L 21/06 704/201 |
| 2006/0271246 A1* | 11/2006 | Bell | B60R 25/04 701/1 |
| 2007/0028273 A1 | 2/2007 | Zanaty | |
| 2007/0046808 A1 | 3/2007 | Sagawa et al. | |
| 2007/0055987 A1 | 3/2007 | Lu et al. | |
| 2007/0061830 A1 | 3/2007 | Chang | |
| 2007/0107020 A1* | 5/2007 | Tavares | H04W 72/082 725/81 |
| 2007/0162923 A1* | 7/2007 | Silveira Da Motta | H04H 60/43 725/14 |
| 2007/0162927 A1 | 7/2007 | Ramaswamy et al. | |
| 2007/0201639 A1* | 8/2007 | Park | G10L 15/30 379/90.01 |
| 2007/0288476 A1 | 12/2007 | Flanagan, III et al. | |
| 2008/0007658 A1 | 1/2008 | Kodama | |
| 2008/0013512 A1* | 1/2008 | Yurugi | H04N 21/233 370/338 |
| 2008/0126420 A1* | 5/2008 | Wright | H04H 60/64 |
| 2009/0010445 A1 | 1/2009 | Matsuo | |

(56) References Cited

U.S. PATENT DOCUMENTS

| | | | |
|---|---|---|---|
| 2009/0016540 A1* | 1/2009 | Heningsen Nielsen | H03G 1/02 381/56 |
| 2010/0138770 A1 | 6/2010 | Lu et al. | |
| 2010/0268540 A1 | 10/2010 | Arshi et al. | |
| 2010/0268573 A1 | 10/2010 | Jain et al. | |
| 2010/0333126 A1 | 12/2010 | Wheeler et al. | |
| 2011/0224992 A1 | 9/2011 | Chaoui et al. | |
| 2012/0102518 A1 | 4/2012 | Wheeler et al. | |
| 2014/0250449 A1 | 9/2014 | Ramaswamy | |

FOREIGN PATENT DOCUMENTS

| | | |
|---|---|---|
| CA | 2306095 | 6/1999 |
| CA | 2539442 | 4/2005 |
| CN | 1230315 | 9/1999 |
| CN | 1253692 | 5/2000 |
| CN | 101262292 | 9/2008 |
| DE | 69736435 | 12/2006 |
| EP | 0161512 | 11/1985 |
| EP | 0195639 | 9/1986 |
| EP | 0210609 | 2/1987 |
| EP | 0245037 | 11/1987 |
| EP | 0283570 | 9/1988 |
| EP | 0309269 | 3/1989 |
| EP | 0325219 | 7/1989 |
| EP | 0358910 | 3/1990 |
| EP | 0598398 | 5/1994 |
| EP | 0598682 | 5/1994 |
| EP | 0687083 | 12/1995 |
| EP | 0703683 | 3/1996 |
| EP | 0744695 | 11/1996 |
| EP | 0817486 | 1/1998 |
| EP | 0840511 | 5/1998 |
| EP | 0944991 | 9/1999 |
| EP | 1089201 | 4/2001 |
| EP | 1089564 | 4/2001 |
| EP | 1166555 | 1/2002 |
| EP | 0985287 | 5/2005 |
| EP | 0956669 | 9/2008 |
| FR | 2555383 | 5/1985 |
| FR | 2717025 | 9/1995 |
| GB | 2138642 | 10/1984 |
| GB | 2170080 | 7/1986 |
| GB | 2176639 | 12/1986 |
| GB | 2294574 | 5/1996 |
| JP | 63084396 | 4/1988 |
| JP | 1177796 | 7/1989 |
| JP | 5327639 | 12/1993 |
| JP | 5347648 | 12/1993 |
| JP | 7255069 | 10/1995 |
| JP | 8508617 | 9/1996 |
| JP | 9083470 | 3/1997 |
| JP | 10145823 | 5/1998 |
| JP | 11275032 | 10/1999 |
| JP | 2002247610 | 8/2002 |
| JP | 4408453 | 2/2010 |
| KR | 930006665 | 7/1993 |
| TW | 200516467 | 5/2005 |
| WO | 8810540 | 12/1988 |
| WO | 8907868 | 8/1989 |
| WO | 9111062 | 7/1991 |
| WO | 9322875 | 11/1993 |
| WO | 9322878 | 11/1993 |
| WO | 9411989 | 5/1994 |
| WO | 9512278 | 5/1995 |
| WO | 9515653 | 6/1995 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9810539 | 3/1998 |
| WO | 9826529 | 6/1998 |
| WO | 9927668 | 6/1999 |
| WO | 9959275 | 11/1999 |
| WO | 9962260 | 12/1999 |
| WO | 0004662 | 1/2000 |
| WO | 0016552 | 3/2000 |
| WO | 0033565 | 6/2000 |
| WO | 0033578 | 6/2000 |
| WO | 0059223 | 10/2000 |
| WO | 0119088 | 3/2001 |
| WO | 0124027 | 4/2001 |
| WO | 0131497 | 5/2001 |
| WO | 0147257 | 6/2001 |
| WO | 0147273 | 6/2001 |
| WO | 0176248 | 10/2001 |
| WO | 02098029 | 12/2002 |
| WO | 03071737 | 8/2003 |
| WO | 03094499 | 11/2003 |
| WO | 2004051997 | 6/2004 |
| WO | 2005025217 | 3/2005 |
| WO | 2005034395 | 4/2005 |
| WO | 2005079501 | 9/2005 |
| WO | 2005119651 | 12/2005 |
| WO | 2007070789 | 6/2007 |
| WO | 2009084864 | 7/2009 |

OTHER PUBLICATIONS

Advanced Television Systems Committee, "Guide to the Use of the ATSC Digital Television Standard," Doc. A/54, Oct. 4, 1995 (148 pages).

Advanced Television Systems Committee, "Program and System Information Protocol for Terrestrial Broadcast and Cable (Revision A) and Amendment No. 1," Doc. A/65A, May 31, 2000 (140 pages).

Advanced Television Systems Committee, "Program/Episode/Version/ Identification ATSC Standard," Doc. A/57, Aug. 30, 1996 (16 pages).

Audio Media, "Digital Audio Watermarking," Jan./Feb. 1998 (4 pages).

Balabanian et al., "An Introduction to Digital Storage Media— Command and Control (DSM-CC)," Institute of Electrical and Electronics Engineers Communications Magazine, Nov. 1996 (11 pages).

BBM, "Matching Pictures, Matching Expectations; The BBM PMT Validation Study Executive Summary Report," Vancouver, Canada, Feb. 9, 1998 (10 pages).

BBM, "The M Files," Picture Matching Technology Pt 2, The Department of Intergalactic Audience Measurement, Canada, Nov. 15, 2000 (2 pages).

Bow, Sing-Tze, "Pattern Recognition and Image Preprocessing; Chapter 2 Nonparametric Decision Theoretic Classification," 1992 (16 pages).

Brownstein, Mark, "Streamlined and Ready for Action," NETGUIDE, 1996 (28 pages).

Canadian Intellectual Property Office, "Examiner's Report," issued in connection with Canadian Patent Application No. 2,279,847, dated Jul. 20, 2009 (2 pages).

Canadian Intellectual Property Office, "Notice of Allowance," issued in connection with Canadian Patent Application No. 2,275,409, dated Oct. 11, 2005 (1 page).

Canadian Intellectual Property Office, "Notice of Allowance," issued in connection with Canadian Patent Application No. 2,539,442, dated Nov. 21, 2012 (1 page).

Canadian Intellectual Property Office, "Notice of Allowance," issued in connection with Canadian Patent Application No. 2,574,998, dated Aug. 10, 2010 (1 page).

Canadian Intellectual Property Office, "Examiner's Report," issued in connection with Canadian Patent Application No. 2,275,409, dated Jan. 6, 2005 (2 pages).

Canadian Intellectual Property Office, "Examiner's Report," issued in connection with Canadian Patent Application No. 2,275,409, dated May 10, 2004 (3 pages).

Canadian Intellectual Property Office, "Examiner's Report," issued in connection with Canadian Patent Application No. 2,289,519, dated Feb. 9, 2000 (3 pages).

(56) References Cited

OTHER PUBLICATIONS

Canadian Intellectual Property Office, "Examiner's Report," issued in connection with Canadian Patent Application No. 2,289,519, dated Jun. 16, 2000 (2 pages).
Canadian Intellectual Property Office, "Examiner's Report," issued in connection with Canadian Patent Application No. 2,539,442, dated Jan. 31, 2012 (3 pages).
Canadian Intellectual Property Office, "Examiner's Report," issued in connection with Canadian Patent Application No. 2,574,998, dated Aug. 26, 2008 (4 pages).
Canadian Intellectual Property Office, "Examiner's Report," issued in connection with Canadian Patent Application No. 2,574,998, dated Mar. 23, 2009 (5 pages).
Canadian Intellectual Property Office, "Examiner's Report," issued in connection with Canadian Patent Application No. 2,574,998, dated Nov. 13, 2009 (10 pages).
Canadian Intellectual Property Office, "Examiner's Report," issued in connection with Canadian Patent Application No. 2,633,577, dated Jul. 16, 2014 (2 pages).
Canadian Intellectual Property Office, "Examiner's Report," issued in connection with Canadian Patent Application No. 2,633,577, dated Jul. 3, 2013 (3 pages).
Yeatts, Mark R., "Doing Business on the Internet: It's Not Just for the 'Big Boys'," Charlottesville Business Journal, vol. 7, No. 2, Feb. 1, 1996 (6 pages).
Chiat/Day, "The New Video Highway: What Will We Need to Know? How Will We Measure It?" Advertising Research Foundation, Jun. 29, 1994, (12 pages).
Cook et al., "Metering Television in the Digital Age" (4 pages).
Duda et al., "Chapter 2 Bayes Decision Theory," Pattern Classification & Scene Analysis, 1973 (18 pages).
Frook, John Evan, "Net Tracking on the PC: NPD Takes New Approach to Measuring Site Traffic," Electronic News, vol. 42, No. 2110, Apr. 1, 1996 (4 pages).
English Language Translation of the Allowed Claims issued in connection with Japanese Patent Application No. 2000-548980, Mar. 24, 2009 (4 pages).
English Language Translation of the Granted Claims issued in connection with Chinese Patent Application No. 98806840.0, Oct. 17, 2003 (5 pages).
English, Erin, "The Meter's Running," LAN Times, Mar. 27, 1995 (2 pages).
European Patent Office, "Decision to Grant," issued in connection with European Patent Application No. 97926814.1, dated Aug. 21, 2008 (1 page).
European Patent Office, "Adjournment of Examination/Opposition Proceedings," issued in connection with European Patent Application No. 00114272.8, mailed Apr. 11, 2006 (1 page).
European Patent Office, "Communication Pursuant to Article 115(2) EPC," issued in connection with European Patent Application No. 00114272.8, dated Aug. 14, 2003 (16 pages).
European Patent Office, "Communication Pursuant to Article 96(2) and Rule 51(2) EPC," issued in connection with European Patent Application No. 98933309.1, dated Mar. 15, 2000 (4 pages).
European Patent Office, "Communication Pursuant to Article 96(2) EPC," issued in connection with European Patent Application No. 00114271.0, dated Jan. 7, 2003 (4 pages).
European Patent Office, "Communication Pursuant to Article 96(2) EPC," issued in connection with European Patent Application No. 00114271.0, dated Sep. 13, 2001 (4 pages).
European Patent Office, "Communication Pursuant to Article 96(2) EPC," issued in connection with European Patent Application No. 00114272.8, dated Jun. 28, 2004 (4 pages).
European Patent Office, "Communication Pursuant to Article 96(2) EPC," issued in connection with European Patent Application No. 00114272.8, dated Nov. 28, 2002 (3 pages).
European Patent Office, "Communication Pursuant to Article 96(2) EPC," issued in connection with European Patent Application No. 00114272.8, dated Jul. 3, 2001 (3 pages).
European Patent Office, "Communication Pursuant to Article 96(2) EPC," issued in connection with European Patent Application No. 98933309.1, dated Apr. 23, 2001 (5 pages).
European Patent Office, "Communication Pursuant to Article 96(2) EPC," issued in connection with European Patent Application No. 98933309.1, dated Jan. 7, 2003 (6 pages).
European Patent Office, "Communication Pursuant to Article 96(2) EPC," issued in connection with European Patent Application No. 98933309.1, dated Sep. 13, 2001 (3 pages).
European Patent Office, "Communication Pursuant to Article 96(2) EPC," issued in connection with European Patent Application No. 98933309.1, dated Sep. 14, 2000 (4 pages).
European Patent Office, "Communication Pursuant to Article 96(2) EPC," issued in connection with European Patent Application No. 97947628.0, dated Apr. 29, 2005 (3 pages).
European Patent Office, "Communication Pursuant to Article 96(2) EPC," issued in connection with European Patent Application No. 97947628.0, dated Jul. 19, 2004 (3 pages).
European Patent Office, "Communication Under Rule 51(4) EPC," issued in connection with European Patent Application No. 97947628.0, dated Feb. 7, 2006 (6 pages).
European Patent Office, "Decision to Grant," issued in connection with European Patent Application No. 00114271.0, dated Apr. 21, 2005 (1 page).
European Patent Office, "Decision to Grant," issued in connection with European Patent Application No. 97947628.0, dated Jul. 6, 2006 (1 page).
European Patent Office, "European Search Report," issued in connection with European Patent Application No. 00114271.0, dated Oct. 16, 2000 (3 pages).
European Patent Office, "European Search Report," issued in connection with European Patent Application No. 00114272.8, dated Oct. 16, 2000 (5 pages).
European Patent Office, "Communication Pursuant to Article 94(3) EPC," issued in connection with European Patent Application No. 07017129.3, dated Feb. 9, 2011 (6 pages).
European Patent Office, "Communication Pursuant to Article 94(3) EPC," issued in connection with European Patent Application No. 07017129.3, dated Oct. 1, 2012 (5 pages).
European Patent Office, "Extended European Search Report," issued in connection with European Patent Application No. 07017129.3, dated Apr. 9, 2009 (10 pages).
European Patent Office, "Intention to Grant," issued in connection with European Patent Application No. 00114271.0, dated Nov. 24, 2004 (10 pages).
European Patent Office, "Intention to Grant," issued in connection with European Patent Application No. 00114272.8, dated Mar. 15, 2007 (4 pages).
European Patent Office, "Intention to Grant," issued in connection with European Patent Application No. 98933309.1, dated Nov. 17, 2004 (11 pages).
European Patent Office, "Provision of the Minutes in Accordance with Rule 76(4) EPC," issued in connection with European Patent Application No. 00114271.0, mailed Nov. 10, 2004 (7 pages).
European Patent Office, "Summons to Attend Oral Proceedings Pursuant to Rule 71(1) EPC," issued in connection with European Patent Application No. 00114271.0, mailed Mar. 11, 2004 (6 pages).
European Patent Office, "Summons to Attend Oral Proceedings," issued in connection with European Patent Application No. 98933309.1, mailed Mar. 12, 2004 (7 pages).
Fairhurst et al. "Some Economic Considerations in the Design of an Optimal N-Tuple Pattern Classifier," Digital Processes, 3, Nov. 1, 1977 (5 pages).
Federal Public Service Ministry of Development, Industry and Foreign Trade National Institute of Industrial Property, "Notice of Allowance in Official Gazette," issued in connection with Brazilian Patent Application No. PI9713896-7, dated Jun. 25, 2013 (1 page).
Federal Public Service Ministry of Development, Industry and Foreign Trade National Institute of Industrial Property, "Technical Examination Report," issued in connection with Brazilian Patent Application No. PI9714323-5, dated Mar. 1, 2010 (6 pages).
Federal Public Service Ministry of Development, Industry and Foreign Trade National Institute of Industrial Property, "Technical

(56) References Cited

OTHER PUBLICATIONS

Examination Report," issued in connection with Brazilian Patent Application No. PI9714323-5, dated Mar. 23, 2012 (4 pages).
JMCT Media Research, "The Evolution of Research Problems on the Information Superhighway," (7 pages).
Harvey, Bill, "Interactive Standards," The Marketing Pulse, vol. XIV, Issue 12, Aug. 31, 1994 (6 pages).
Helinski, Paul, "Automating Web-Site Maintenance Part 2 Perl-Based Tools to Manage Your Website," Web Techniques, vol. 1, No. 9, XP-002048313, Dec. 1996 (2 pages).
Hoffman et al., "How Big is the Internet?" Wired.com, Aug. 18, 1994, retrieved from <http://hotwired.com/Lib/Extras/how.big.html> (2 pages).
Indian Patent Office, "First Examination Report," issued in connection with Indian Patent Application No. 1812/MAS/98, dated Dec. 30, 2004 (3 pages).
Infoseek Corporation, "Search Results for 'NPD'," retrieved from worldwide web on Jul. 1, 1996 (2 pages).
Instituto Mexicano de la Propiedad Industrial, "Notice of Allowance," issued in connection with Mexican Patent Application No. MX/a/2012/006439, dated Sep. 11, 2013 (2 pages).
Instituto Mexicano de la Propiedad Industrial, "Notice of Allowance," issued in connection with Mexican Patent Application No. MX/a/2013/015117, dated Apr. 22, 2014 (2 pages).
Instituto Mexicano de la Propiedad Industrial, "Office Action," issued in connection with Mexican Patent Application No. MX/a/2013/015117, dated Feb. 6, 2014 (4 pages).
Instituto Mexicano de la Propiedad Industrial, "Second Office Action," issued in connection with Mexican Patent Application No. MX/a/2008/007596, dated Feb. 14, 2012 (4 pages).
Instituto Mexicano de la Propiedad Industrial, "First Office Action," issued in connection with Mexican Patent Application No. PA/a/2004/008118, dated Jul. 2, 2007 (1 page).
Instituto Mexicano de la Propiedad Industrial, "Second Office Action," issued in connection with Mexican Patent Application No. PA/a/2004/008118, dated Jan. 2, 2008 (1 page).
Interactive Marketing News, "PC-Meter Unveils Second Quarter Rankings of Most Visited Sites," Jul. 5, 1996 (2 pages).
International Preliminary Examining Authority, "Preliminary Examination of Patentability," issued in connection with International Patent Application No. PCT/US2004/28171, dated Apr. 7, 2006 (11 pages).
International Searching Authority, "International Search Report," issued in connection with International Patent Application No. PCT/US2004/28171, dated Aug. 24, 2005 (3 pages).
International Searching Authority, "Written Opinion," issued in connection with International Patent Application No. PCT/US2004/28171, dated Aug. 24, 2005 (5 pages).
International Preliminary Examining Authority, "Preliminary Examination Report," issued in connection with International Patent Application No. PCT/US1997/021643, dated Mar. 30, 1999 (27 pages).
International Searching Authority, "International Search Report," issued in connection with International Patent Application No. PCT/US1997/021643, dated Nov. 12, 1998 (9 pages).
International Preliminary Examining Authority, "Written Opinion," issued in connection with International Patent Application No. PCT/US1997/021643, dated Feb. 24, 1999 (7 pages).
International Preliminary Examining Authority, "Preliminary Examination Report," issued in connection with International Patent Application No. PCT/US1997/09218, dated Apr. 21, 1999 (11 pages).
International Preliminary Examining Authority, "Written Opinion," issued in connection with International Patent Application No. PCT/US1997/009218, dated Mar. 8, 1999 (6 pages).
International Searching Authority, "International Search Report," issued in connection with International Patent Application No. PCT/US1997/009218, dated Jan. 26, 1998 (4 pages).

International Bureau, "International Preliminary Report on Patentability," issued in connection with International Patent Application No. PCT/US2005/013765, dated Feb. 13, 2007 (4 pages).
International Searching Authority, "International Search Report and Written Opinion," issued in connection with International Patent Application No. PCT/US2005/13765, dated Jan. 26, 2007 (5 pages).
International Bureau, "International Preliminary Report on Patentability," issued in connection with International Patent Application No. PCT/US2005/005271, dated Aug. 22, 2006 (4 pages).
International Searching Authority, "Written Opinion," issued in connection with International Patent Application No. PCT/US2005/005271, dated Mar. 23, 2006 (3 pages).
International Searching Authority, "International Search Report," issued in connection with International Patent Application No. PCT/US2005/005271, dated Mar. 23, 2006 (1 page).
International Searching Authority, "International Search Report," issued in connection with International Patent Application No. PCT/US1998/023558, dated Aug. 27, 1999 (4 pages).
International Searching Authority, "International Search Report," issued in connection with International Patent Application No. PCT/US1994/011795, dated Feb. 24, 1995 (1 page).
International Searching Authority, "International Search Report," issued in connection with International Patent Application No. PCT/US2000/003829, dated Aug. 18, 2000 (3 pages).
International Preliminary Examining Authority, "Preliminary Examination Report," issued in connection with International Patent Application No. PCT/US2000/003829, dated Dec. 31, 2002 (2 pages).
International Searching Authority, "International Search Report," issued in connection with corresponding International Patent Application No. PCT/US2005/026426, dated Aug. 18, 2006 (1 page).
International Searching Authority, "Written Opinion," issued in connection with corresponding International Patent Application No. PCT/US2005/026426, dated Aug. 18, 2006 (7 pages).
International Bureau, "Preliminary Examination of Patentability," issued in connection with International Patent Application No. PCT/US2005/026426, dated Feb. 1, 2007 (9 pages).
International Searching Authority, "International Search Report," issued in connection with corresponding International Patent Application No. PCT/US2006/61917, dated Dec. 28, 2007 (2 pages).
International Searching Authority, "Written Opinion," issued in connection with International Patent Application No. PCT/US2006/61917, dated Dec. 28, 2007 (8 pages).
International Searching Authority, "International Search Report," issued in connection with International Patent Application PCT/US1998/14286, dated Jan. 7, 1999 (3 pages).
"The Claims Defining the Invention," which were allowed in connection with Australian Patent Application Serial No. 57830/01, Dec. 3, 2002 (4 pages).
"The Claims Defining the Invention," which were allowed in connection with Australian Patent Application Serial No. 57831/01, Sep. 9, 2003 (1 page).
"The Claims Defining the Invention," which were allowed in connection with Australian Patent Application Serial No. 57832/01, Oct. 27, 2003 (2 pages).
IP Australia, "Examiner's First Report," issued in connection with Australian Patent Application No. 2003262297, dated Jul. 6, 2005 (2 pages).
IP Australia, "Examiner's First Report," issued in connection with Australian Patent Application No. 31489/97, dated Mar. 2, 2000 (1 page).
IP Australia, "Examiner's First Report," issued in connection with Australian Patent Application No. 46028/01, dated Jun. 13, 2002 (1 page).
IP Australia, "Examiner's First Report," issued in connection with Australian Patent Application No. 82980/98, dated Jul. 24, 2000 (2 pages).
IP Australia, "Examiner's Second Report," issued in connection with Australian Patent Application No. 31489/97, dated Mar. 21, 2001 (1 page).
IP Australia, "Notice of Acceptance," issued in connection with Australian Patent Application No. 31489/97, dated May 30, 2001 (2 pages).

(56) References Cited

OTHER PUBLICATIONS

IP Australia, "Notice of Acceptance," issued in connection with Australian Patent Application No. 57828/01, dated Dec. 3, 2002 (2 pages).
IP Australia, "Notice of Acceptance," issued in connection with Australian Patent Application No. 57830/01, dated Dec. 3, 2002 (2 pages).
IP Australia, "Notice of Acceptance," issued in connection with Australian Patent Application No. 57831/01, dated Sep. 9, 2003 (2 pages).
IP Australia, "Notice of Acceptance," issued in connection with Australian Patent Application No. 57832/01, dated Oct. 27, 2003 (2 pages).
IP Australia, "Examiner's First Report," issued in connection with Australian Patent Application No. 2006325808, dated Apr. 29, 2010 (2 pages).
IP Australia, "Examiner's First Report," issued in connection with Australian Patent Application No. 71524/00, dated May 21, 2002 (2 pages).
IP Australia, "Examiner's First Report," issued in connection with Australian Patent Application No. 71525/00, dated May 21, 2002 (1 page).
IP Australia, "Examiner's First Report," issued in connection with Australian Patent Application No. 71526/00, dated May 21, 2002 (1 page).
IP Australia, "Examiner's Report," issued in connection with Australian Patent Application No. 52668/98, dated Feb. 11, 2000 (1 page).
IP Australia, "Examiner's First Report," issued in connection with Australian Patent Application No. 71527/00, dated May 21, 2002 (1 pages).
IP Australia, "Examiner's Second Report," issued in connection with Australian Patent Application No. 2006325808, dated May 20, 2011 (3 pages).
IP Australia, "Notice of Acceptance," issued in connection with Australian Patent Application No. 52668/98, dated Jun. 27, 2000 (2 pages).
IP Australia, "Notice of Acceptance," issued in connection with Australian Patent Application No. 71526/00, dated Sep. 9, 2003 (2 pages).
IP Australia, "Notice of Acceptance," issued in connection with Australian Patent Application Serial No. 57833/01, dated Dec. 3, 2002 (2 pages).
IP Australia, "Notice of Acceptance," issued in connection with Australian Patent Application No. 71524/00, dated Sep. 9, 2003 (2 pages).
IP Australia, "Response to Applicant's Request Under Section 104 of the Patents Act 1990," issued in connection with Australian Patent Application No. 71527/00, mailed Jan. 16, 2001 (1 page).
Japan Patent Office, "Notice of Allowance," issued in connection with Japanese Patent Application No. 2000-548980, dated Mar. 10, 2009 (2 pages).
Japan Patent Office, "Decision of Rejection," issued in connection with Japanese Patent Application No. Hei10-534297, dated Sep. 30, 2003 (3 pages).
Japan Patent Office, "Decision of Rejection," issued in connection with Japanese Patent Application No. Hei 10-526729, dated Apr. 7, 2009 (5 pages).
Japan Patent Office, "Final Rejection," issued in connection with Japanese Patent Application No. 2003-292746, dated Nov. 22, 2005 (3 pages).
Japan Patent Office, "Notice of Allowance," issued in connection with Japanese Patent Application No. Hei 10-526729, dated Oct. 27, 2009 (5 pages).
Japan Patent Office, "Notice of Grounds for Rejection," issued in connection with Japanese Patent Application No. 10-534297, dated May 13, 2003 (6 pages).
Japan Patent Office, "Notice of Grounds for Rejection," issued in connection with Japanese Patent Application No. 2003-292746, dated Mar. 22, 2005 (9 pages).
Japan Patent Office, "Notice of Grounds of Rejection," issued in connection with Japanese Patent Application No. 2000-548980, dated May 9, 2008 (6 pages).
Japan Patent Office, "Notice regarding Submission of Prior Art Document by an Anonymous Third Party," issued in connection with Japanese Patent Application No. 2000-548980, on May 25, 2007 (3 pages).
Japan Patent Office, "Notification Document of Refusal Reasons," issued in connection with Japanese Patent Application No. 10-526729, dated Oct. 21, 2008 (8 pages).
Japan Patent Office, "Notice of Grounds of Rejection," issued in connection with Japanese Patent Application No. 2000-548980, dated Apr. 8, 2008 (6 pages).
Khare, Rohit, "Demographics," Nov. 6, 1995, retrieved from <http://www.w3.org/pub/www/demographics>, retrieved on Oct. 4, 1996 (3 pages).
Kim et al., "Auditory Processing of Speech Signals for Robust Speech Recognition in Real-World Noisy Environments," IEEE Transactions on Speech and Audio Processing, vol. 7, No. 1, Jan. 1999 (15 pages).
Marketing News, "1996 Business Report on the Marketing Research Industry," Jun. 3, 1996 (37 pages).
Namba et al., "A Program Identification Code Transmission System Using Low-Frequency Audio Signals," NHK Science and Technical Research Laboratories, Tokyo, Japan, Mar. 1985 (14 pages).
Next Century Media, Inc., "Preliminary Summary Overview of Studies of Interactivity for 4AS Casie Research Sub-Committee" (11 pages).
Purdye et al., "Matching Pictures, Matching Expectations: The BBM Validation Test of TN-AGB's Picture Matching Technology," conducted in Vancouver, Canada, 1998 (11 pages).
SCTE DVS 136, "An Overview of PSIP for Cable," ATSC T3/S8 Doc. 268, Apr. 3, 1998 (5 pages).
Steele et al., "Simultaneous Transmission of Speech and Data Using Code-Breaking Techniques," pp. 2061-2105, vol. 60, No. 9, The Bell System Technical Journal, American Telephone and Telegraph Company, issued in Nov. 1981 (25 pages).
The State Intellectual Property Office of P.R. China, "Decision of Reexamination," issued in connection with Chinese Patent Application No. 97182123.2, dated Jul. 6, 2005 (2 pages).
The State Intellectual Property Office of P.R. China, "First Office Action," issued in connection with Chinese Patent Application No. 97182123.2, dated Dec. 13, 2002 (11 pages).
The State Intellectual Property Office of P.R. China, "First Office Action," issued in connection with Chinese Patent Application No. 200810091335.3, dated Jul. 3, 2009 (7 pages).
The State Intellectual Property Office of P.R. China, "First Office Action," issued in connection with Chinese Patent Application No. 97181455.4, dated Jun. 7, 2002 (6 pages).
The State Intellectual Property Office of P.R. China, "Notice of Acceptance of the Request for Reexamination," issued in connection with Chinese Patent Application No. 97182123.2, dated May 18, 2005 (2 pages).
The State Intellectual Property Office of P.R. China, "Notice of Completion of Formalities for Patent Registration," issued in connection with Chinese Patent Application No. 97182123.2, mailed Jan. 25, 2008 (5 pages).
The State Intellectual Property Office of P.R. China, "First Office Action," issued in connection with Chinese Patent Application No. 200680052652.3, dated Feb. 5, 2010 (33 pages).
The State Intellectual Property Office of P.R. China, "Fifth Office Action," issued in connection with Chinese Patent Application No. 200680052652.3, dated Jan. 21, 2013 (7 pages).
The State Intellectual Property Office of P.R. China, "First Office Action," issued in connection with Chinese Patent Application No. 200310123387.1, dated Dec. 8, 2006 (8 pages).
The State Intellectual Property Office of P.R. China, "First Office Action," issued in connection with Chinese Patent Application No. 98806840.0, dated Oct. 25, 2002 (9 pages).
The State Intellectual Property Office of P.R. China, "Fourth Office Action," issued in connection with Chinese Patent Application No. 200680052652.3, dated Jun. 14, 2012 (4 pages).

(56) References Cited

OTHER PUBLICATIONS

The State Intellectual Property Office of P.R. China, "Notice of Decision of Granting Patent Right for Invention," issued in connection with Chinese Patent Application No. 97181455.4, mailed May 21, 2004 (4 pages).
The State Intellectual Property Office of P.R. China, "Notice of Grant of Patent Right to Invention," issued in connection with Chinese Patent Application No. 98806840.0, mailed Oct. 17, 2003 (5 pages).
The State Intellectual Property Office of P.R. China, "Rejection Decision," issued in connection with Chinese Patent Application No. 200310123387.1, dated Apr. 4, 2008 (4 pages).
The State Intellectual Property Office of P.R. China, "Second Office Action," issued in connection with Chinese Patent Application No. 200310123387.1, dated Aug. 3, 2007 (7 pages).
The State Intellectual Property Office of P.R. China, "Second Office Action," issued in connection with Chinese Patent Application No. 97181455.4, dated Apr. 25, 2003 (9 pages).
The State Intellectual Property Office of P.R. China, "Second Office Action," issued in connection with Chinese Patent Application No. 98806840.0, dated Apr. 25, 2003 (7 pages).
The State Intellectual Property Office of P.R. China, "Second Office Action," issued in connection with Chinese Patent Application No. 2006800526523, dated Jan. 26, 2011 (11 pages).
Video Research, Ltd., "English language translation of Information Statement," submitted with the Japan Patent Office in connection with Japanese Patent Application No. 2000-548980, on May 25, 2007 (8 pages).
Wylie, Kenneth, "Special Report: Ad Age Dataplace: 100 Leading Research Companies: Events, New Interest Help Hard-Chargers Clear Hurdles, Jump 11.3% to $3.7 Billion" Advertising Age, May 20, 1996 (5 pages).
United States Patent and Trademark Office, "Advisory Action," issued in connection with U.S. Appl. No. 11/339,269, dated Feb. 25, 2009 (3 pages).
United States Patent and Trademark Office, "Final Office Action," issued in connection with U.S. Appl. No. 11/339,269, dated Nov. 26, 2008 (26 pages).
United States Patent and Trademark Office, "Non-Final Office Action," issued in connection with U.S. Appl. No. 11/339,269, dated Feb. 15, 2008 (27 pages).
United States Patent and Trademark Office, "Notice of Allowance," issued in connection with U.S. Appl. No. 11/339,269, dated Jun. 8, 2009 (6 pages).
United States Patent and Trademark Office, "Advisory Action," issued in connection with U.S. Appl. No. 08/763,750, dated Jun. 2, 2008 (3 pages).
United States Patent and Trademark Office, "Advisory Action," issued in connection with U.S. Appl. No. 08/763,750, dated Oct. 17, 2003 (3 pages).
United States Patent and Trademark Office, "Advisory Action," issued in connection with U.S. Appl. No. 08/786,270, dated Dec. 11, 2000 (1 page).
United States Patent and Trademark Office, "Advisory Action," issued in connection with U.S. Appl. No. 10/284,409, dated Aug. 19, 2009 (2 pages).
United States Patent and Trademark Office, "Advisory Action," issued in connection with U.S. Appl. No. 10/284,409, dated Jun. 3, 2008 (3 pages).
United States Patent and Trademark Office, "Decision on Appeal," issued in connection with U.S. Appl. No. 08/786,270, mailed Mar. 31, 2003 (18 pages).
United States Patent and Trademark Office, "Decision on Appeal," issued in connection with U.S. Appl. No. 09/076,517, mailed Sep. 26, 2006 (12 pages).
United States Patent and Trademark Office, "Non-Final Office Action," issued in connection with U.S. Appl. No. 08/763,750, dated Jan. 17, 2001 (17 pages).
United States Patent and Trademark Office, "Election/Restriction Requirement," issued in connection with U.S. Appl. No. 08/763,750, dated Mar. 29, 1999 (4 pages).
United States Patent and Trademark Office, "Election/Restrictions Requirement," issued in connection with U.S. Appl. No. 10/693,549, dated Nov. 13, 2008 (6 pages).
United States Patent and Trademark Office, "Examiner's Answer in response to the Appeal Brief filed Apr. 13, 2005," issued in connection with U.S. Appl. No. 09/076,517, mailed Nov. 2, 2005 (14 pages).
United States Patent and Trademark Office, "Examiner's Communication," issued in connection with U.S. Appl. No. 08/786,270, dated Jul. 10, 2001 (2 pages).
United States Patent and Trademark Office, "Final Office Action," issued in connection with U.S. Appl. No. 08/763,750, dated Apr. 6, 2006 (5 pages).
United States Patent and Trademark Office, "Final Office Action," issued in connection with U.S. Appl. No. 08/763,750, dated Mar. 17, 2008 (13 pages).
United States Patent and Trademark Office, "Final Office Action," issued in connection with U.S. Appl. No. 08/763,750, dated May 15, 2003 (15 pages).
United States Patent and Trademark Office, "Final Office Action," issued in connection with U.S. Appl. No. 08/763,750, dated Sep. 10, 2002 (14 pages).
United States Patent and Trademark Office, "Final Office Action," issued in connection with U.S. Appl. No. 09/076,517, dated Aug. 11, 2003 (14 pages).
United States Patent and Trademark Office, "Final Office Action," issued in connection with U.S. Appl. No. 09/076,517, dated Mar. 11, 2004 (15 pages).
United States Patent and Trademark Office, "Final Office Action," issued in connection with U.S. Appl. No. 09/909,224, dated Aug. 1, 2007 (24 pages).
United States Patent and Trademark Office, "Final Office Action," issued in connection with U.S. Appl. No. 09/909,224, dated Jun. 15, 2006 (20 pages).
United States Patent and Trademark Office, "Final Office Action," issued in connection with U.S. Appl. No. 09/909,224, dated Sep. 17, 2009 (30 pages).
United States Patent and Trademark Office, "Final Office Action," issued in connection with U.S. Appl. No. 09/949,938, dated Nov. 7, 2003 (9 pages).
United States Patent and Trademark Office, "Final Office Action," issued in connection with U.S. Appl. No. 10/284,409, dated Jun. 18, 2009 (9 pages).
United States Patent and Trademark Office, "Final Office Action," issued in connection with U.S. Appl. No. 10/284,409, dated Mar. 18, 2008 (11 pages).
United States Patent and Trademark Office, "Final Office Action," issued in connection with U.S. Appl. No. 10/693,549, dated Nov. 12, 2009 (12 pages).
United States Patent and Trademark Office, "Final Office Action," issued in connection with U.S. Appl. No. 08/786,270, dated Sep. 5, 2000 (8 pages).
United States Patent and Trademark Office, "Final Office Action" issued in connection with U.S. Appl. No. 12/088,798, dated Oct. 12, 2011 (11 pages).
United States Patent and Trademark Office, "Final Office Action" issued in connection with U.S. Appl. No. 12/088,798, dated Sep. 9, 2013 (22 pages).
United States Patent and Trademark Office, "Non-Final Office Action," issued in connection with U.S. Appl. No. 08/763,750, dated Aug. 19, 1999 (6 pages).
United States Patent and Trademark Office, "Non-Final Office Action," issued in connection with U.S. Appl. No. 08/763,750, dated Nov. 17, 2008 (12 pages).
United States Patent and Trademark Office, "Non-Final Office Action," issued in connection with U.S. Appl. No. 08/763,750, dated Nov. 27, 2002 (10 pages).
United States Patent and Trademark Office, "Non-Final Office Action," issued in connection with U.S. Appl. No. 08/763,750, dated Sep. 10, 2007 (12 pages).

(56) References Cited

OTHER PUBLICATIONS

United States Patent and Trademark Office, "Non-Final Office Action," issued in connection with U.S. Appl. No. 08/763,750, dated Sep. 11, 2001 (19 pages).
United States Patent and Trademark Office, "Non-Final Office Action," issued in connection with U.S. Appl. No. 08/786,270, dated Jan. 20, 2000 (7 pages).
United States Patent and Trademark Office, "Non-Final Office Action," issued in connection with U.S. Appl. No. 08/786,270, dated Jul. 28, 1999 (7 pages).
United States Patent and Trademark Office, "Election/Restriction," issued in connection with U.S. Appl. No. 08/786,270, dated Jun. 16, 1999 (5 pages).
United States Patent and Trademark Office, "Non-Final Office Action," issued in connection with U.S. Appl. No. 09/076,517, dated Nov. 19, 2002 (11 pages).
United States Patent and Trademark Office, "Non-Final Office Action," issued in connection with U.S. Appl. No. 09/076,517, dated Mar. 5, 2002 (8 pages).
United States Patent and Trademark Office, "Non-Final Office Action," issued in connection with U.S. Appl. No. 09/859,764, dated May 22, 2002 (5 pages).
United States Patent and Trademark Office, "Non-Final Office Action," issued in connection with U.S. Appl. No. 09/909,224, dated Feb. 6, 2009 (26 pages).
United States Patent and Trademark Office, "Non-Final Office Action," issued in connection with U.S. Appl. No. 09/909,224, dated Mar. 22, 2007 (22 pages).
United States Patent and Trademark Office, "Non-Final Office Action," issued in connection with U.S. Appl. No. 09/909,224, dated Oct. 19, 2005 (16 pages).
United States Patent and Trademark Office, "Non-Final Office Action," issued in connection with U.S. Appl. No. 09/949,938, dated May 9, 2003 (7 pages).
United States Patent and Trademark Office, "Non-Final Office Action," issued in connection with U.S. Appl. No. 09/949,938, dated Oct. 24, 2002 (5 pages).
United States Patent and Trademark Office, "Non-Final Office Action," issued in connection with U.S. Appl. No. 10/284,409, dated Dec. 30, 2008 (10 pages).
United States Patent and Trademark Office, "Non-Final Office Action," issued in connection with U.S. Appl. No. 10/284,409, dated Oct. 5, 2007 (9 pages).
United States Patent and Trademark Office, "Non-Final Office Action," issued in connection with U.S. Appl. No. 10/693,549, dated Apr. 1, 2009 (11 pages).
United States Patent and Trademark Office, "Non-Final Office Action," issued in connection with U.S. Appl. No. 11/595,117, dated Nov. 25, 2008 (5 pages).
United States Patent and Trademark Office, "Non-Final Office Action," issued in connection with U.S. Appl. No. 12/631,538, dated Aug. 31, 2012 (10 pages).
United States Patent and Trademark Office, "Non-Final Office Action," issued in connection with U.S. Appl. No. 12/631,538, dated Mar. 22, 2013 (11 pages).
United States Patent and Trademark Office, "Non-Final Office Action," issued in connection with U.S. Appl. No. 12/631,538, dated Oct. 10, 2013 (7 pages).
United States Patent and Trademark Office, "Non-Final Office Action," issued in connection with U.S. Appl. No. 13/222,828, dated Jun. 5, 2013 (16 pages).
United States Patent and Trademark Office, "Non-Final Office Action," issued in connection with U.S. Appl. No. 12/024,559, dated Dec. 18, 2009 (12 pages).
United States Patent and Trademark Office, "Non-Final Office Action" issued in connection with U.S. Appl. No. 12/088,798, dated Apr. 11, 2013 (24 pages).
United States Patent and Trademark Office, "Non-Final Office Action" issued in connection with U.S. Appl. No. 12/088,798, dated Jan. 25, 2011 (9 pages).
United States Patent and Trademark Office, "Notice of Allowance and Examiner's Interview Summary," issued in connection with U.S. Appl. No. 08/763,750, dated Jun. 26, 2009 (7 pages).
United States Patent and Trademark Office, "Notice of Allowance," issued in connection with U.S. Appl. No. 08/763,750, dated Apr. 16, 2009 (4 pages).
United States Patent and Trademark Office, "Notice of Allowance," issued in connection with U.S. Appl. No. 08/786,270, dated Jul. 28, 2003 (5 pages).
United States Patent and Trademark Office, "Notice of Allowance," issued in connection with U.S. Appl. No. 09/859,764, dated Sep. 3, 2002 (4 pages).
United States Patent and Trademark Office, "Notice of Allowance," issued in connection with U.S. Appl. No. 10/284,409, dated Oct. 8, 2009 (4 pages).
United States Patent and Trademark Office, "Notice of Allowance," issued in connection with U.S. Appl. No. 10/693,549, dated Mar. 17, 2010 (8 pages).
United States Patent and Trademark Office, "Notice of Allowance," issued in connection with U.S. Appl. No. 12/631,538, dated Feb. 25, 2014 (5 pages).
United States Patent and Trademark Office, "Notice of Allowance," issued in connection with U.S. Appl. No. 12/823,374, dated Feb. 3, 2011 (8 pages).
United States Patent and Trademark Office, "Notice of Allowance," issued in connection with U.S. Appl. No. 13/092,355, dated Jan. 16, 2013 (13 pages).
United States Patent and Trademark Office, "Notice of Allowance and Examiner Initiated Summary," issued in connection with U.S. Appl. No. 13/222,828, dated Jan. 2, 2014 (11 pages).
United States Patent and Trademark Office, "Notice of Allowance" issued in connection with U.S. Appl. No. 12/088,798, dated Feb. 14, 2014 (7 pages).
United States Patent and Trademark Office, "Requirement for Restriction/Election," issued in connection with U.S. Appl. No. 13/222,828, dated Mar. 4, 2013 (7 pages).
United States Patent and Trademark Office, "Notice of Allowance and Examiner-Initiated Interview Summary," issued in connection with U.S. Appl. No. 14/277,456, dated Dec. 24, 2014 (8 pages).
International Searching Authority, "International Preliminary Report on Patentability," issued in connection with International Patent Application No. PCT/US2006/61917, dated Jun. 18, 2008 (8 pages).
The State Intellectual Property Office of P.R. China, "Decision of Rejection," issued in connection with Chinese Patent Application No. 200680052652.3, dated Jul. 17, 2013 (7 pages).
IP Australia, "Notice of Acceptance," issued in connection with Australian Patent Application No. 2006325808, dated Dec. 5, 2011 (3 pages).
Japan Patent Office, "Decision of Rejection," issued in connection with Japanese Patent Application No. 2000-548980, dated Sep. 9, 2008 (4 pages).
The State Intellectual Property Office of P.R. China, "Decision of Rejection," issued in connection with Chinese Patent Application No. 200810091335.3, dated Jan. 22, 2010 (3 pages).
Canadian Intellectual Property Office, "Notice of Allowance," issued in connection with Canadian Patent Application No. 2,279,847, dated May 12, 2010 (1 page).
European Patent Office, "Intention to Grant," issued in connection with European Patent Application No. 07017129.3, dated May 7, 2012 (6 pages).
European Patent Office, "Intention to Grant," issued in connection with European Patent Application No. 97926814.1, dated Apr. 7, 2008 (6 pages).
European Patent Office, "Examination Report," issued in connection with European Patent Application No. 97926814.1, dated Sep. 7, 2004 (2 pages).
European Patent Office, "Examination Report," issued in connection with European Patent Application No. 97926814.1, dated Jul. 25, 2006 (5 pages).
Marquis Security Cameras, "Overhead Speaker With Hidden Wireless Nanny Cam Inside," Mar. 11, 2009 (3 pages).
Aun, Fred, The ClickZ Network, "Nielsen Pairs with Cable Co on Set Top Box Data," Mar. 13, 2008 (1 page).

(56) References Cited

OTHER PUBLICATIONS

United States Patent and Trademark Office, "Notice of Allowability," issued in connection with U.S. Appl. No. 11/375,648, dated Nov. 2, 2008 (3 pages).

Udrea et al., "Speech Enhancement Using Spectral Over-Subtraction and Residual Noise Reduction," International Symposium on Signals, Circuits and Systems, 2003. SCS 2003. vol. 1, Jul. 2003, pp. 165-168 (4 pages).

United States Patent and Trademark Office, "Notice of Allowance," issued in connection with U.S. Appl. No. 12/024,559, dated Mar. 29, 2010 (24 pages).

United States Patent and Trademark Office, "Notice of Allowance," issued in connection with U.S. Appl. No. 11/375,648, dated Nov. 2, 2007 (6 pages).

United States Patent and Trademark Office, "Non-Final Office Action," issued in connection with U.S. Appl. No. 12/505,966, dated Oct. 6, 2011 (16 pages).

United States Patent and Trademark Office, "Final Office Action," issued in connection with U.S. Appl. No. 12/505,966, dated May 10, 2012 (15 pages).

United States Patent and Trademark Office, "Non-Final Office Action," issued in connection with U.S. Appl. No. 12/505,966, dated Sep. 12, 2014 (20 pages).

United States Patent and Trademark Office, "Notice of Allowance," issued in connection with U.S. Appl. No. 12/505,966, dated Apr. 22, 2015 (9 pages).

Canadian Intellectual Property Office, "Notice of Allowance," issued in connection with Canadian Patent Application No. 2,633,577, dated Sep. 9, 2015 (1 page).

\* cited by examiner

US 10,469,901 B2

METHODS AND APPARATUS TO VERIFY PRESENTATION OF MEDIA CONTENT

RELATED APPLICATIONS

This patent is a continuation U.S. patent application Ser. No. 12/505,966, entitled "Methods and Apparatus to Verify Presentation of Media Content," filed Jul. 20, 2009, which claims the benefit of U.S. Provisional Patent Application No. 61/110,274, entitled "Methods and Apparatus to Monitor Media Content," and filed Oct. 31, 2008, which are hereby incorporated by reference in their entireties.

FIELD OF THE DISCLOSURE

This disclosure relates generally to media content and, more particularly, to methods and apparatus to verify presentation of media content.

BACKGROUND

In audience measurement applications, determining the media content being presented by a media presentation device (e.g., a television program being displayed on a television) can be accomplished by, for example, monitoring the audio emanating from the media presentation device. If the presented media content includes watermarks, codes, or other identifiers embedded in the content, then extracting the identifier(s) facilitates the detection of program information. An alternative to this "active" approach is a "passive" technique based on computed fingerprints or signatures. Signatures are unique or semi-unique representations of media content segments derived from one or more of the properties of the media content signal, such as its local frequency distribution. Signature methods require reference signatures for all possible media content of interest. By comparing signatures derived from media content presented by a media presentation device (e.g., a home television set) with the reference signatures, the media content (e.g., a television program) being presented by the media presentation device can be identified.

Persons subscribing to cable, Internet protocol (IP), wireless and/or satellite content distribution services often receive media content signals via, for example, a set top-box (STB) installed by a service provider and/or a user. An example STB can determine, log and/or report information about media content (e.g., channels) tuned to and/or selected via user controls, such as a remote control. This media content information may be transmitted back to the service provider and/or an audience measurement entity via a back channel. By analyzing such information from one or more customer premises, ratings information and/or media consumption statistics can be determined.

DESCRIPTION

Example methods and apparatus to verify presentation of media content are disclosed. A disclosed example apparatus for use with a set-top box (STB) and a media presentation device includes an audio input interface to receive a first audio signal associated with a program selected by a user via the STB, a microphone to receive a free-field radiating second audio signal output by at least one of the media presentation device or an audio system associated with the media presentation device, a comparator to compare the second audio signal to the first audio signal to form an output, and an output interface to provide a value indicative of whether the program selected by the user via the STB is presented at the media presentation device.

Another disclosed example apparatus for use with a STB and a media presentation device a transducer to receive a free-field radiating first audio signal output by at least one of the media presentation device or an audio system associated with the media presentation device, a filter having adaptive weights to receive a second audio signal associated with a program selected by a user from an audio output line of the STB, and to process the second audio signal to generate a delayed and attenuated third audio signal, a difference detector to subtract the third audio signal from the first audio signal to form a residual signal, and a comparator to form a value indicative of whether the program selected by the user via the STB is presented at the media presentation device.

A disclosed example method to verify presentation at a media presentation device of media content selected at a tuning device includes receiving a first audio signal associated with the media content received at the tuning device, receiving a free-field radiating second audio signal output by the media presentation device, comparing the second audio signal to the first audio signal to form an output, and providing a value indicative of whether the media content received by the tuning device was presented at the media presentation device.

Figure 1:
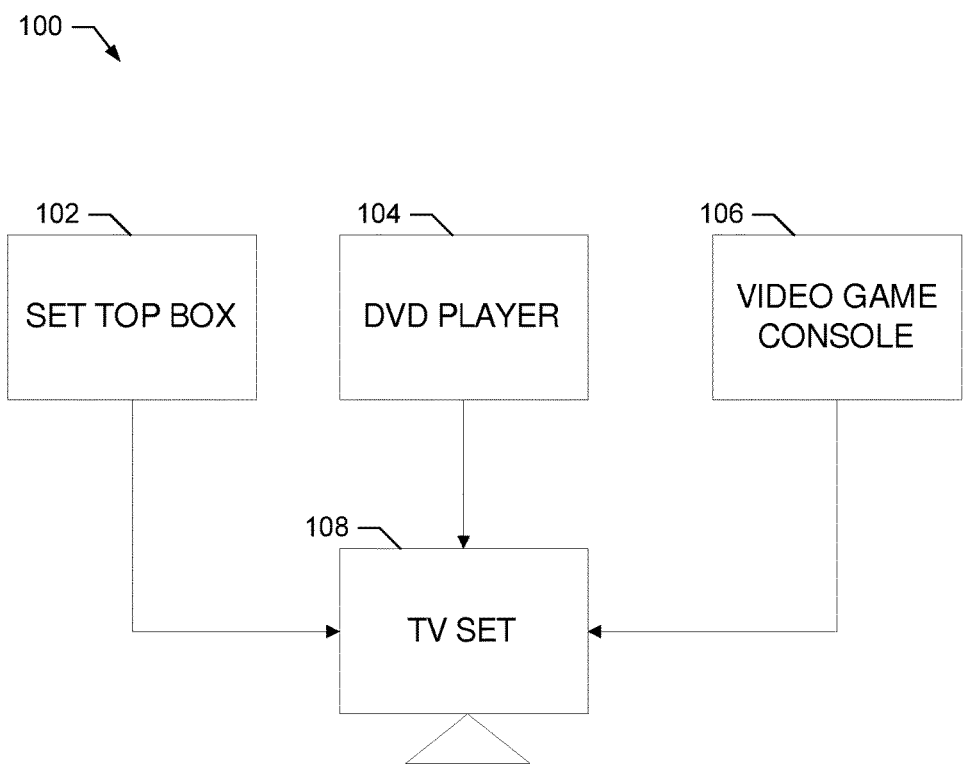
FIG. 1 is a block diagram of an example home entertainment system.

FIG. 1 is a block diagram of an example prior-art home entertainment system 100 that includes a STB 102, a digital versatile disk (DVD) player 104, a video game console 106, and a television 108. While a user may turn on the example STB 102 and select a particular media content channel and/or program, the television 108 may be set to display different media content output by the DVD player 104 and/or the video game console 106. Thus, even when the STB 102 is configured to tune and/or to receive a specific channel and/or media content, there is no guarantee that the television 108 connected to the STB 102 is set to actually use the STB 102 as its input source. Accordingly, the example STB 102 of FIG. 1 cannot determine and/or verify whether the television 108 is actually presenting the media content output by the STB 102.

Figure 2:
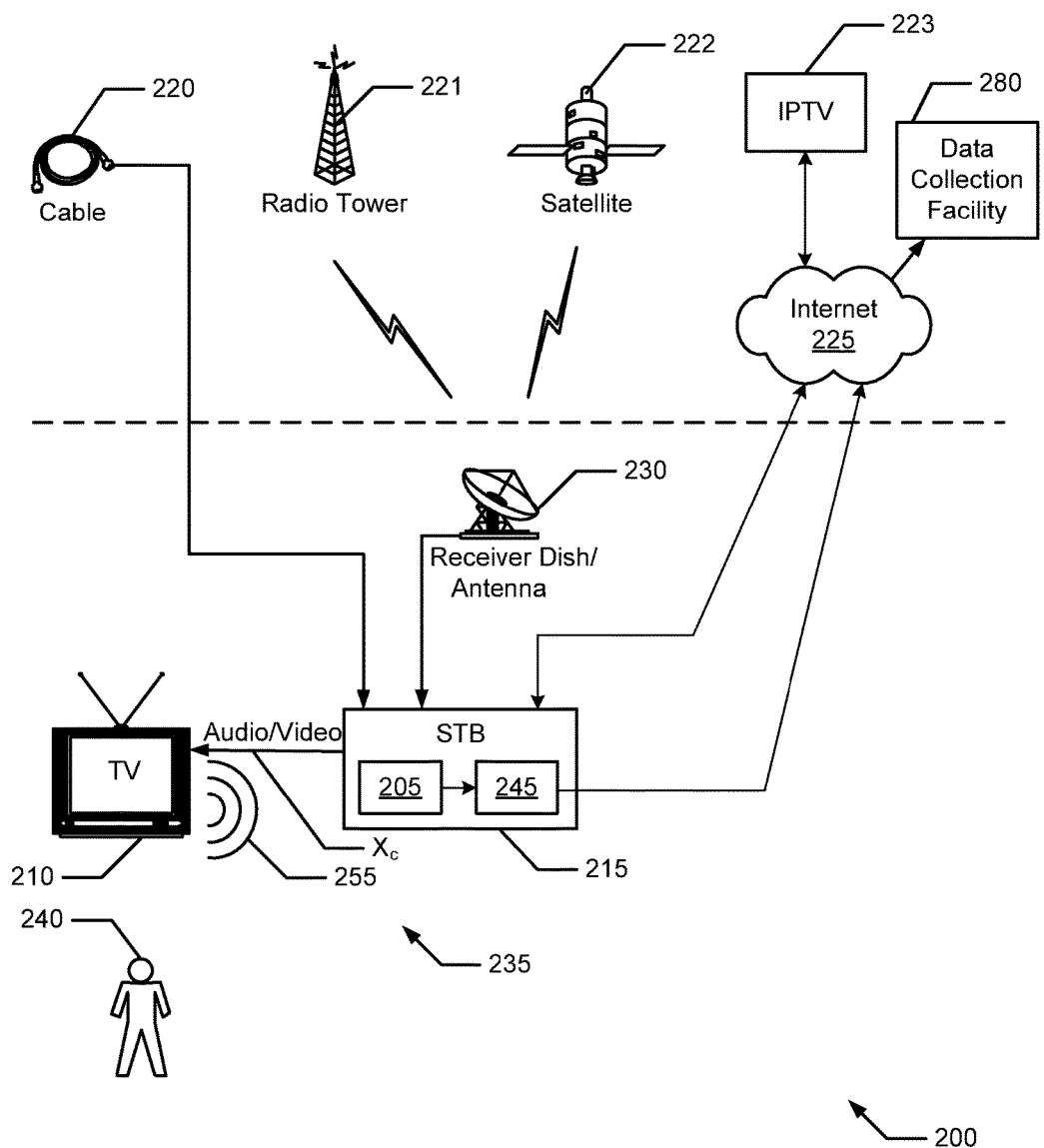
FIG. 2 is a block diagram of an example media content delivery system including a presentation verifier constructed in accordance with the teachings of this disclosure.

FIG. 2 illustrates an example media content delivery system 200 that includes a presentation verifier 205 to verify the presentation of media content by and/or at any number and/or type(s) of media presentation devices, one of which is designated at reference numeral 210. While for discussion purposes, the example media presentation device 210 of FIG. 2 is a television, the methods and apparatus described herein may be used to verify media content presentation by and/or at any other number and/or type(s) of media presentation devices. As described below in connection with FIGS. 3 and 4, the example presentation verifier 205 of FIG. 2 can be implemented by and/or within a tuning device 215, such as a STB, and/or may be implemented as a standalone device 400 (FIG. 4) placed and/or installed in-line between the example STB 215 and the example television 210. Moreover, while a STB is depicted in FIG. 2, any other number and/or type(s) of devices (e.g., a personal computer, a game console, a smart phone, a cellular phone, etc.) may, additionally or alternatively, be used to implement the tuning device 215.

Media content (e.g., television programs, movies, radio programs, videos, games, audio, etc.) may be provided to the STB 215 by any number and/or type(s) of service providers, four of which are designated at reference numerals 220, 221, 222 and 223. Example service providers 220-223 include, but are not limited to, a cable television based service provider 220, a cellular and/or wireless based service provider 221, a satellite based service provider 222, and/or an Internet protocol (IP) television (IPTV) based service provider 223. Media content received at the STB 215 may be encoded and/or formatted in accordance with any past, present and/or future standard, specification, format and/or recommendation, such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc. Moreover, the example STB 215 of FIG. 2 may be communicatively coupled to the example service providers 220-223 via any number and/or type(s) of communication path(s), medium(s) and/or communication device(s). For example, the IPTV based service provider 223 may be communicatively coupled to the STB 215 via any public and/or private IP-based network, such as the Internet 225. The example cellular, wireless and/or satellite based service providers 221 and 222 may be communicatively coupled to the STB 215 via an antenna 230.

In the illustrated example of FIG. 2, the television 210 is located in a viewing area 235 within a customer premises occupied by one or more persons (also referred to herein as household member(s) 240), at least some of whom have agreed to participate in an audience measurement research study. The example viewing area 235 of FIG. 2 includes the area in which the television 210 is located and from which the television 210 may be viewed by the household member(s) 240 present in the viewing area 235.

To collect media content consumption, presentation and/or viewing information with respect to the household member(s) 240, the example STB 215 of FIG. 2 includes a metering module 245. The example metering module 245 of FIG. 2 provides collected media viewing, presentation and/or consumption information, as well as other tuning and/or demographic data, via, for example, the Internet 225 to a central data collection facility 280. The example data collection facility 280 of FIG. 2 processes and/or stores data received from the metering module 245, and/or similar devices in other viewing areas and/or at other customer premises, to produce ratings information and/or to develop meaningful content exposure statistics. For instance, the example data collection facility 280 can determine the overall effectiveness, reach and/or audience demographics of media content using any number and/or type(s) of statistical method(s). In some examples, the metering module 245 stores a log of audience measurement data and periodically (e.g., once a day) and/or aperiodically (e.g., upon occurrence of one or more events and/or conditions) sends the collected data to the data collection facility 280 for processing. Additionally or alternatively information associated with the presented media content and the household member(s) 240 may be provided to the data collection facility 280 in real-time or substantially real-time as the presentation of media content occurs.

The example metering module 245 of FIG. 2 interacts with any number and/or type(s) of tuners 305 (FIG. 3) implemented by and/or within the STB 215 to identify which media content is and/or has been received and/or tuned by the STB 215. Additionally or alternatively, the audience metering module 245 can identify the tuned and/or received media content from watermarks that have been embedded in the media content (e.g., any audio or video watermark) and/or based on computed and/or derived signatures (e.g., audio signatures, video signatures, etc.). However, as described above, such media content may not actually be presented by the television 210 even though tuned, received and/or output by the STB 215. For example, when the STB 215 is operating but the person 240 is playing a computer game via the television 210, media content received, tuned and/or output by the STB 215 is not actually presented to the person 240 and, thus, should not be recorded, logged and/or reported by the metering module 245 as having been presented.

To verify media content presentation, the example presentation verifier 205 of FIG. 2 compares audio data $X_c$ output and/or provided by the example STB 215 to the example television 210 with a free-field radiating audio signal 255 output by a speaker of the television 210 and/or by an audio system associated with the television 210. When the example presentation verifier 205 determines that the audio data $X_c$ output by the STB 215 substantially and/or sufficiently corresponds to the audio signal 255 presented by the audio equipment associated with the television 210, then the metering module 245 logs and/or reports the tuned and/or received media content as presented by the television 210. By verifying the presentation of media content, the accuracy of the audience measurement information reported and/or stored by the metering module 245 is improved and, accordingly, ratings information developed by the data collection facility 280 are more accurate and/or representative of actual audience behavior.

While the example components shown in FIG. 2 are depicted as separate structures within the media content delivery system 200, the functions performed by these components may be integrated within a single unit or may be implemented as two or more separate components. For example, although the television 210 and the STB 215 are depicted as separate devices, the television 210 and the STB 215 may be implemented in a single unit. In other examples, the STB 215, the metering module 245 and the presentation verifier 205 may be implemented as physically separate devices communicatively coupled via one or more cables. In still other examples, the television 210, the STB 215, the metering module 245, and the presentation verifier 205 are implemented in a single unit.

Figure 3:
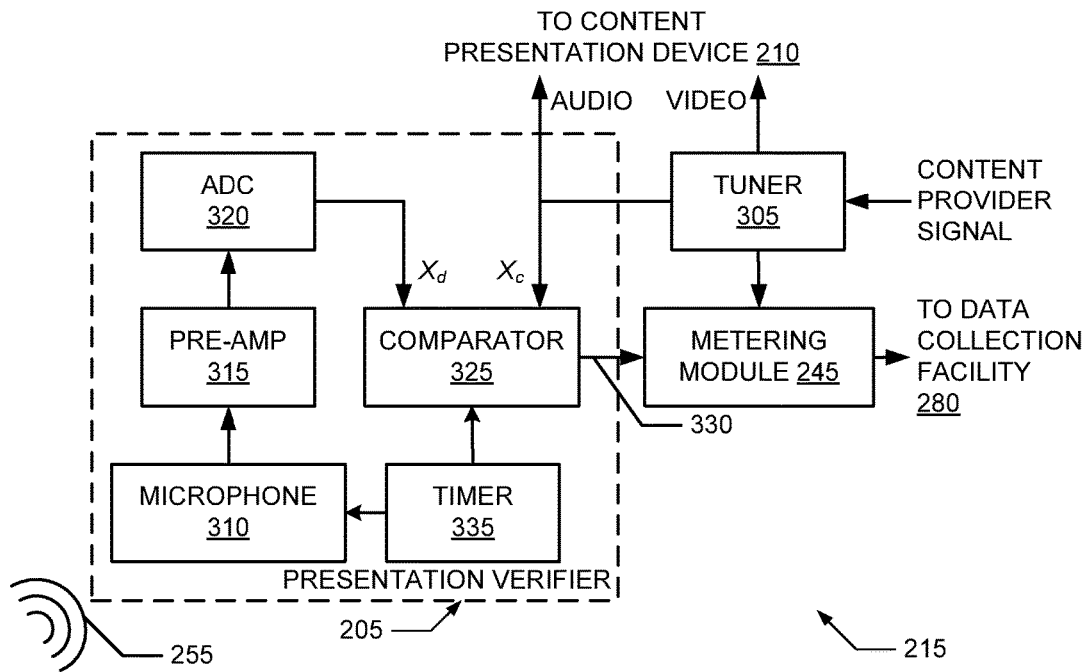
FIG. 3 illustrates an example manner of implementing the example presentation verifier and/or, more generally, the example STB of FIG. 2.

FIG. 3 illustrates an example manner of implementing the example presentation verifier 205 and/or, more generally, the example STB 215 of FIG. 2. In the example of FIG. 3, the tuner 305, the metering module 245 and the presentation verifier 205 are implemented in, by and/or together with the STB 215. The example tuner 305 of FIG. 3 receives media content signals from one or more of the example service providers 220-223 of FIG. 2. Based on user inputs, the example tuner 305 tunes to and/or otherwise obtains media content selected by a user of the STB 215, and outputs corresponding audio and/or video portions of the media content to the attached media content presentation device 210. As illustrated in FIG. 3, the audio portion of the media content is also provided to a comparator 325.

To receive the free-field radiating audio signal 255 output by a speaker of the example television 210 and/or by an audio system associated with the television 210, the example presentation verifier 205 of FIG. 3 includes any type of microphone 310 (e.g., a transducer), any type of pre-amplifier 315 and any type of analog-to-digital converter (ADC) 320. The example microphone 310 of FIG. 3 converts the free-field radiating sound waves 255 into an electrical signal that is amplified by the example pre-amplifier 315 and converted to a stream of digital samples $X_d$ by the example ADC 320. In some examples, the microphone 310 is affixed to a side of the STB 215 and picks up audio 255 in the vicinity of the STB 215. Additionally or alternatively, the microphone 310 may be wired or wirelessly coupled to the STB 215 so that the microphone 310 can be placed in a desired location separate from the STB 215. In addition, the microphone 310 may be replaced by any other type of audio input. For example, the STB 215 may be attached to an audio output of the media presentation device 210, and/or a speaker and/or speaker wire of the media presentation device 210 or an audio system associated with the media presentation device 210. While not shown in FIG. 3, if the audio signal $X_c$ output by the tuner 305 is an analog signal, the audio signal $X_c$ is also converted to a stream of digital samples using an amplifier and ADC similar to the pre-amp 315 and the ADC 320, respectively. Accordingly, during the following discussion, $X_c$ will be used to refer to a stream of digital samples corresponding to the audio output by the tuner 305.

To compare the audio signal $X_c$ output by the tuner 305 to the digital representation $X_d$ of the audio signal 255 output by the television 210 and/or an audio system associated with the television 210, the example presentation verifier 205 of FIG. 3 includes the comparator 325. The example comparator 325 of FIG. 3 compares the two audio signals $X_d$ and $X_c$ to determine whether they have similarities. The example comparator 325 determines whether the audio signal $X_c$ received from the tuner 305 is present, albeit in a possibly modified form, in the audio signal $X_d$ received via the microphone 310. In other words, the comparator 325 determines whether the media content presentation device 210 attached to the STB 215 is presenting the media content tuned to and/or received via the STB 215 so that the audio signal $X_c$ associated with the media content is present in the ambient audio 255 at the location of the media content presentation device 210.

To compare the audio signals $X_c$ and $X_d$, the example comparator 325 of FIG. 3 applies a filter 505 (FIG. 5), which compensates for delay and/or attenuation present between audio signal $X_c$ and the audio signal $X_d$. When the coefficients of the filter 505 have been adapted to represent such delay and/or attenuation characteristics, the filtered audio signal $X_c$ will substantially match the audio signal $X_d$. How closely the filtered audio signal $X_c$ and the audio signal $X_d$ match can be determined by, for example, subtracting the filtered audio signal $X_c$ from the audio signal $X_d$ to form a residual signal. When they are substantially similar, the residual signal will have a small magnitude and/or small signal strength. Thus, by comparing the magnitude of the residual signal to a threshold, the example comparator 325 of FIG. 3 can determine whether the media content received and/or tuned by the tuner 305 was presented at the media presentation device 210. Additionally or alternatively, as described below in connection with FIG. 6, the coefficients of the filter 505 can be analyzed to determine whether the media content was presented. An example filter structure, commonly referred to in the industry as an echo canceller, that can be used to implement the example comparator 325 is described below in connection with FIG. 5.

When the example comparator 325 of FIG. 3 determines that the signals $X_d$ and $X_c$ correspond to the same media content (e.g., when the residual signal of the comparator 325 has a small magnitude), the example comparator 325 provides an indication 330 having a first value (e.g., TRUE or one) to the metering module 245 that the media content received and/or tuned via the tuner 305 was presented by and/or at the media presentation device 210. Otherwise, the example comparator 325 outputs the indication 330 having a second value (e.g., FALSE or zero) to the metering module 245 that the media content received and/or tuned via the tuner 305 was not presented by and/or at the media presentation device 210.

Based on the indication 330, the example metering module 245 determines whether media presentation information for the media content corresponding to the audio signal $X_c$ should be stored and/or provided to the data collection facility 280. The example metering module 245 may additionally store and/or transmit to the data collection facility 280 additional information about the currently tuned program. For example, the metering module 245 and/or the tuner 305 may extract metadata from the media content provider signal and/or metadata in a program guide and transmit the information together with an identification as to whether or not the media content presentation device 210 presented the media content. Accordingly, the STB 215 and/or the data collection facility 280 can determine what media content was tuned by the STB 215 and whether that media content was presented by the media content presentation device 210 attached to the STB 215. The STB 215 may associate the identification with a timestamp so that the information transmitted to the data collection facility 280 can be used to determine the time(s) that the media content was presented by the media content presentation device 210.

To protect the privacy of the household member(s) 240, the example presentation verifier 205 of FIG. 3 includes a timer 335. The example timer 335 periodically and/or aperiodically enables and disables the microphone 310, the pre-amp 315 and/or the ADC 320 such that the comparator 325 and/or, more generally, the example presentation verifier 205 operate in a burst mode. For example, the timer 335 may enable the microphone 310, for example, for three seconds to allow the comparator 325 to converge its filter coefficients and to make a determination whether the audio signal $X_d$ corresponds to the audio signal $X_c$. The timer 335 may then disable the microphone 310 for several seconds, before re-enabling the microphone 310. How often the microphone 310 is enabled may be selected based on a desired granularity of media content presentation information to be reported by the example metering module 245.

Figure 4:
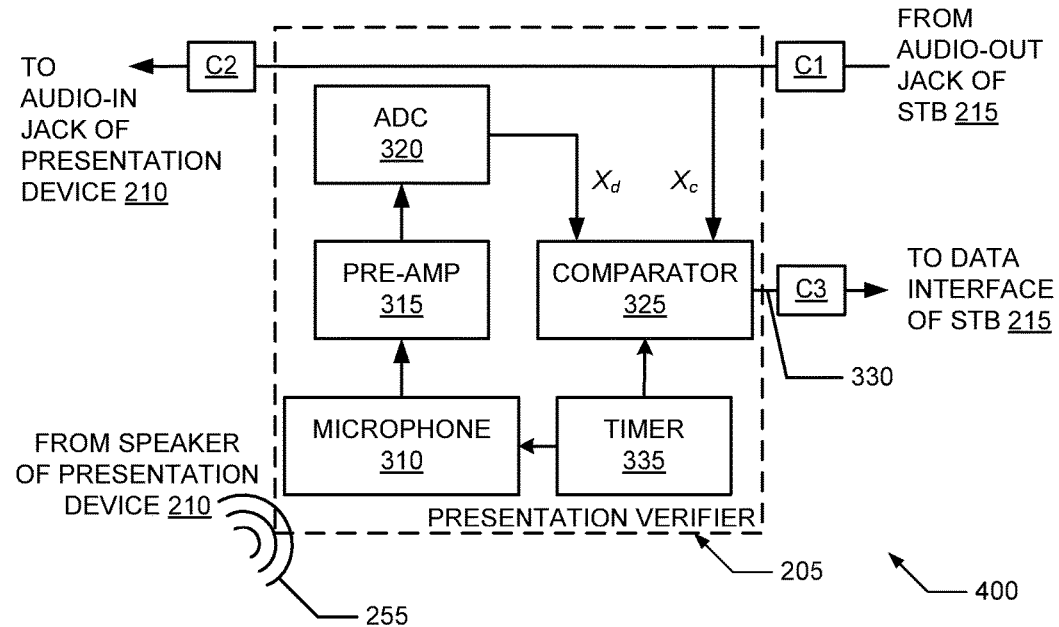
FIG. 4 illustrates an example standalone in-line presentation verification device that may be used to implement the example presentation verifier of FIG. 2.

FIG. 4 illustrates an example manner of implementing the example presentation verifier 205 of FIGS. 2 and 3 as a standalone in-line presentation verification device 400 that is user installable between the STB 215 and the television 210. That is, the example in-line presentation verification device 400 of FIG. 4 can be installed between the STB 215 and the television 210 at a time other than (e.g., after) when either the STB 215 or the television 210 were manufactured and/or assembled. Some components of the example in-line presentation verification device 400 of FIG. 4 are substantially similar or identical to those of FIG. 3. Accordingly, identical references numerals have been used in FIGS. 3 and 4 for identical components, and the interested reader is referred to the discussion presented above in connection with FIG. 3 for descriptions of the identically numbered components.

To allow the in-line presentation verification device 400 to be user and/or technician installed between the STB 215 and the media presentation device 210, the example in-line presentation verification device 400 of FIG. 4 includes connectors C1, C2 and C3. The example connector C1 of FIG. 1 is to electrically couple the audio signal $X_c$ from an audio-out jack and/or connector of the STB 215 to the comparator 325 via a first cable. As shown in FIG. 4, the audio signal $X_c$ received via the connector C1 is also passed through and output via the example connector C2. The example connector C2 of FIG. 4 is to electrically couple the audio signal $X_c$ to an audio-in jack and/or connector of the media presentation device 210 via a second cable. As illustrated in FIG. 4, the in-line presentation verification device 400 of FIG. 4 may be installed in-line between the audio-out jack of the STB 215 and the audio-in jack of the media presentation device 210. Example connectors that may be used to implement the connectors C1 and C2 include, but are not limited to, an RCA connector, a high-definition multimedia interface (HDMI) connector, a tip-sleeve (TS) connector and/or a tip-ring-sleeve (TRS) connector.

The media content presentation verification indications 330 determined by the comparator 325 are provided to the metering module 245 via the example connector C3. In some examples, the example connector C3 of FIG. 4 is a universal serial bus (USB) connector and a USB protocol and/or data signal is used to transfer the indication 330 from the comparator 325 to the metering module 245 and/or, more generally, to the example STB 215.

While example manners of implementing the example presentation verifier 205 of FIG. 2 have been illustrated in FIGS. 3 and 4, one or more of the interfaces, data structures, elements, processes and/or devices illustrated in FIGS. 3 and/or 4 may be combined, divided, re-arranged, omitted, eliminated and/or implemented in any other way. Further, the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 of FIGS. 3 and 4, respectively, may be implemented by hardware, software, firmware and/or any combination of hardware, software and/or firmware. Thus, for example, any of the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any claim of this patent incorporating one or more of these elements is read to cover a purely software and/or firmware implementation, at least one of the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 are hereby expressly defined to include a tangible computer-readable medium. Example tangible computer-readable media include, but are not limited to, a flash memory, a compact disc (CD), a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of tangible computer-readable media. Further still, the example STB 215 and/or the example in-line presentation verification device 400 may include interfaces, data structures, elements, processes and/or devices instead of, or in addition to, those illustrated in FIGS. 3 and/or 4, and/or may include more than one of any or all of the illustrated interfaces, data structures, elements, processes and/or devices.

Figure 5:
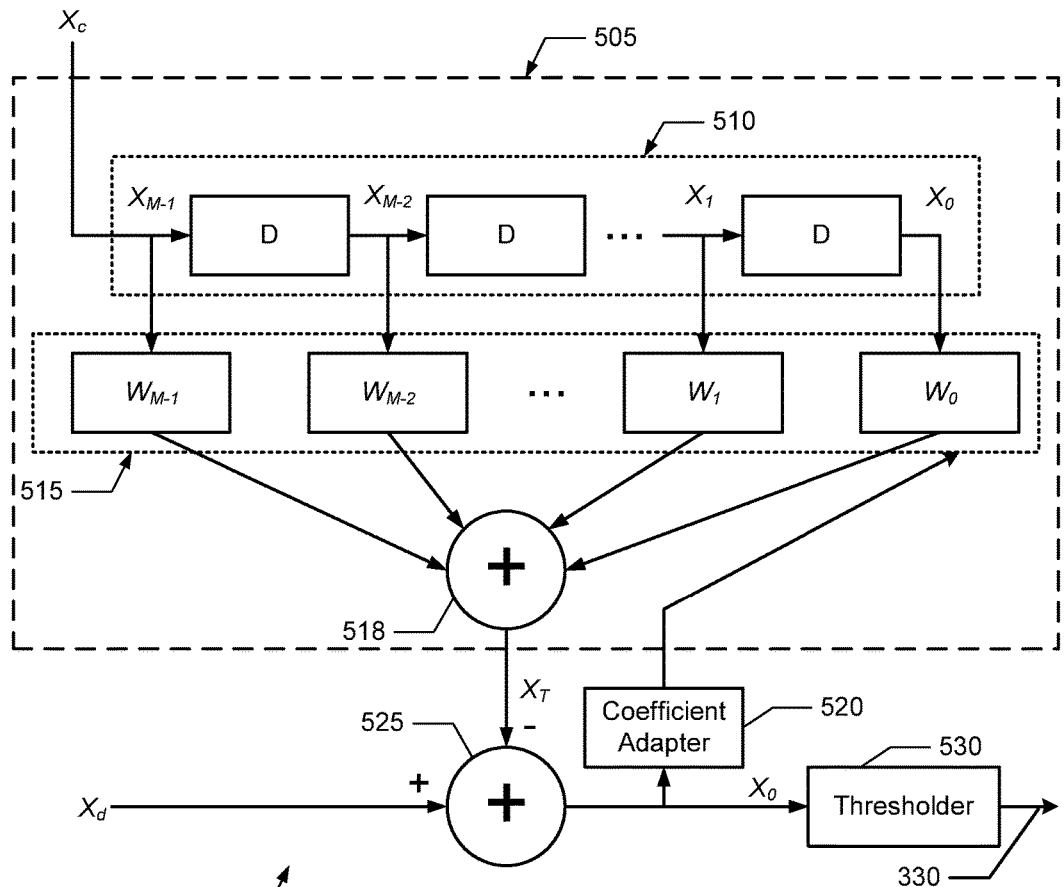
FIG. 5 illustrates an example manner of implementing the example comparators of FIGS. 3 and 4.

FIG. 5 illustrates an example manner of implementing the example comparator 325 of FIGS. 3 and 4. The example comparator 325 of FIG. 5 is configured as an echo canceller. Thus, the example comparator 325 operates to modify the audio signal $X_c$ that corresponds to the audio signal $X_d$ (if present) so that when the filtered version $X_T$ of the audio signal $X_c$ is subtracted from the audio signal $X_d$, the residual signal $X_O$ is minimized. Accordingly, when the audio signal $X_c$ substantially comprises a modified version of the audio signal $X_d$, the residual signal $X_O$ will be small.

Figure 6:
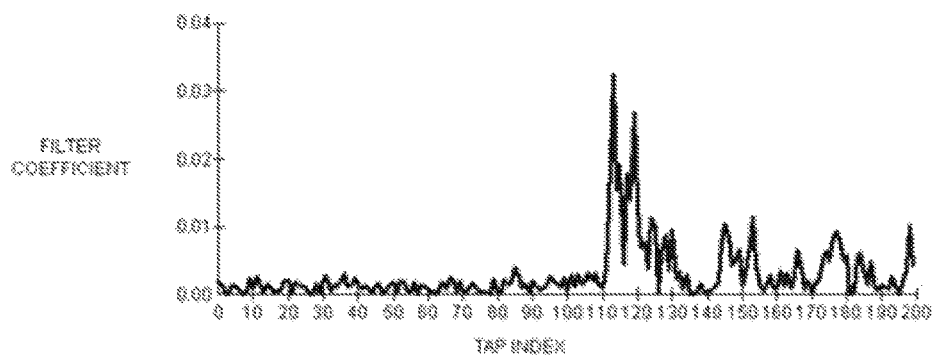
FIG. 6 illustrates an example filter coefficient magnitude distribution.

To form the estimate $X_T$ of the audio signal $X_d$ from the received audio signal $X_c$, the example comparator 325 of FIG. 5 includes a finite impulse response (FIR) filter 505. To compensate for audio propagation delays and/or multiple sound wave paths due to reflections off of walls and/or other objects in the viewing area 235, the example filter 505 includes a delay line 510 of M shift registers. To compensate for attenuation of the audio signal 255 during its propagation through the viewing area 235, the example filter 505 includes one or more filter coefficients 515. Filter coefficients may also be referred to as weights and/or filter taps. To adjust the audio signal $X_c$ so that the portion of the audio signal $X_c$ corresponds more closely with the audio signal $X_d$, the audio signal $X_c$ has to be delayed and attenuated, as shown in FIG. 5. In the illustrated example of FIG. 5, the filter coefficient 515 with the largest magnitude corresponds to the delay that the audio $X_c$ is subjected-to in order to align itself with the microphone 310 detected audio signal $X_d$. In some examples, the distribution of the filter coefficients 515 may be configured to ensure that the coefficient with the maximum magnitude is significantly larger than the other coefficients. Accordingly, as shown in FIG. 6, the other coefficients 515 in the vicinity of the coefficient 515 with the maximum magnitude exhibit a decay characteristic. For convenience, only the first 200 of 400 taps are shown in the graph of FIG. 6. The maximum filter coefficient magnitude (in this example 0.033) is an indicator of the extent of attenuation that the audio signal $X_c$ has experienced between the internal tuner 305 and the microphone 310.

The output $X_T$ of the filter 505 is a summation of the weighted samples, which can be mathematically expressed as:

$$X_T = \sum_{m=0}^{m=M-1} W_m X_m, \quad \text{EQN (1)}$$

where $W_m$ are the values of the filter coefficients 515. The values $X_m$ correspond to the differently delayed samples of the audio signal $X_c$ formed by the example delay line 510 of FIG. 5. To compute the sum of the weighted samples, the example comparator 325 of FIG. 5 includes any type of summer 518.

To adapt the filter coefficients 515, the example comparator 325 of FIG. 5 includes a coefficient adapter 520. The example coefficient adapter 520 adjusts the filter coefficients 515 to minimize the difference $X_0$ between the audio signal $X_d$ and the filtered audio signal $X_T$. That is, the coefficient adapter 520 operates to substantially minimize the residual signal $X_0$. In some example, the initial values of the filter coefficients 515 are set to zero when the microphone 310 is enabled. Additionally or alternatively, the values of the filter coefficients 515 can be frozen, fixed and/or retained while the microphone 310 is disabled. The example coefficients adjustor 520 adjusts the filter coefficients 515 by applying the following equation:

$$W_m(n+1) = W_m(n) + \mu X_0 X_m(n), \quad \text{EQN (2)}$$

where the index n is an iteration index denoting the time in sample counts at which the coefficient updates are made and $\mu$ is a learning factor, which is usually set to a low value such as 0.05. The application of EQN (2) gradually minimizes the least mean squared (LMS) value of the residual error signal $X_0$.

To compute the error and/or residual signal $X_0$, the example comparator 325 of FIG. 5 includes a subtractor 525. The example subtractor 525 generates the residual signal $X_0$ by subtracting the filtered signal $X_T$ from the audio signal $X_d$.

An example implementation uses a 16 kHz sampling rate (any desired sampling rate may be used) and uses M=400 filter coefficients 515 $W_0$ through $W_{M-1}$, supporting a maximum time delay of 25 milliseconds between the audio signal $X_c$ and the audio signal $X_d$. If the audio $X_d$ picked up by the microphone 310 predominantly corresponds to the audio signal $X_c$, the filter weights 515 readily adapt themselves to substantially stationery values and the error signal $X_0$ decreases to a low value in approximately one second. The extent to which the residual signal $X_0$ is not zero may depend on any number and/or type(s) of factors, such as the presence of ambient noise in the viewing area 235, quantization noise, computation noise, finite-precision arithmetic effects, etc. When the audio $X_d$ is different from the audio $X_c$, the adaptation process will not be able to substantially reduce and/or minimize the error signal $X_0$. Therefore, by comparing the error signal $X_0$ energy with a threshold (e.g., a predetermined threshold), the comparator 325 can determine whether the audio 255 emanating from the speakers matches the tuner audio $X_c$. When a good match is identified, the comparator 325 can also analyze the distribution of filter coefficients to determine whether one filter coefficient has a magnitude that is greater than all the other coefficients, as depicted in FIG. 6.

To compare the magnitude of the residual signal $X_0$ to a threshold, the example comparator 325 includes a thresholder 530. When the magnitude of the residual signal $X_0$ exceeds the threshold, the indication 330 has a first value (e.g., TRUE or one). When the magnitude of the residual signal $X_0$ does not exceed the threshold, the indication 330 has a different value (e.g., FALSE or zero).

While an example manner of implementing the example comparators 325 of FIGS. 3 and 4 has been illustrated in FIG. 5, one or more of the interfaces, data structures, elements, processes and/or devices illustrated in FIG. 5 may be combined, divided, re-arranged, omitted, eliminated and/or implemented in any other way. For example, the subtractor 525 and the filter 505 may be implemented in the same or separate integrated circuits. Further, the example filter 505, the example delay line 510, the example filter coefficients 515, the example summer 518, the example coefficient adapter 520, the example subtractor 525, the example thresholder 530 and/or, more generally, the example comparator 325 of FIG. 5 may be implemented by hardware, software, firmware and/or any combination of hardware, software and/or firmware. Thus, for example, any of the example filter 505, the example delay line 510, the example filter coefficients 515, the example summer 518, the example coefficient adapter 520, the example subtractor 525, the example thresholder 530 and/or, more generally, the example comparator 325 may be implemented by one or more circuit(s), programmable processor(s), ASIC(s), PLD(s), FPLD(s), and/or FPGA(s), etc. When any claim of this patent incorporating one or more of these elements is read to cover a purely software and/or firmware implementation, at least one of the example filter 505, the example delay line 510, the example filter coefficients 515, the example summer 518, the example coefficient adapter 520, the example subtractor 525, the example thresholder 530 and/or, more generally, the example comparator 325 are hereby expressly defined to include a tangible computer-readable medium. Example tangible computer-readable media include, but are not limited to, a flash memory, a CD, a DVD, a floppy disk, a ROM, a RAM, a PROM, an EPROM, and/or an EEPROM, an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of tangible computer-readable media. Further still, the example comparator 325 may include interfaces, data structures, elements, processes and/or devices instead of, or in addition to, those illustrated in FIG. 5, and/or may include more than one of any or all of the illustrated interfaces, data structures, elements, processes and/or devices.

Figure 7:
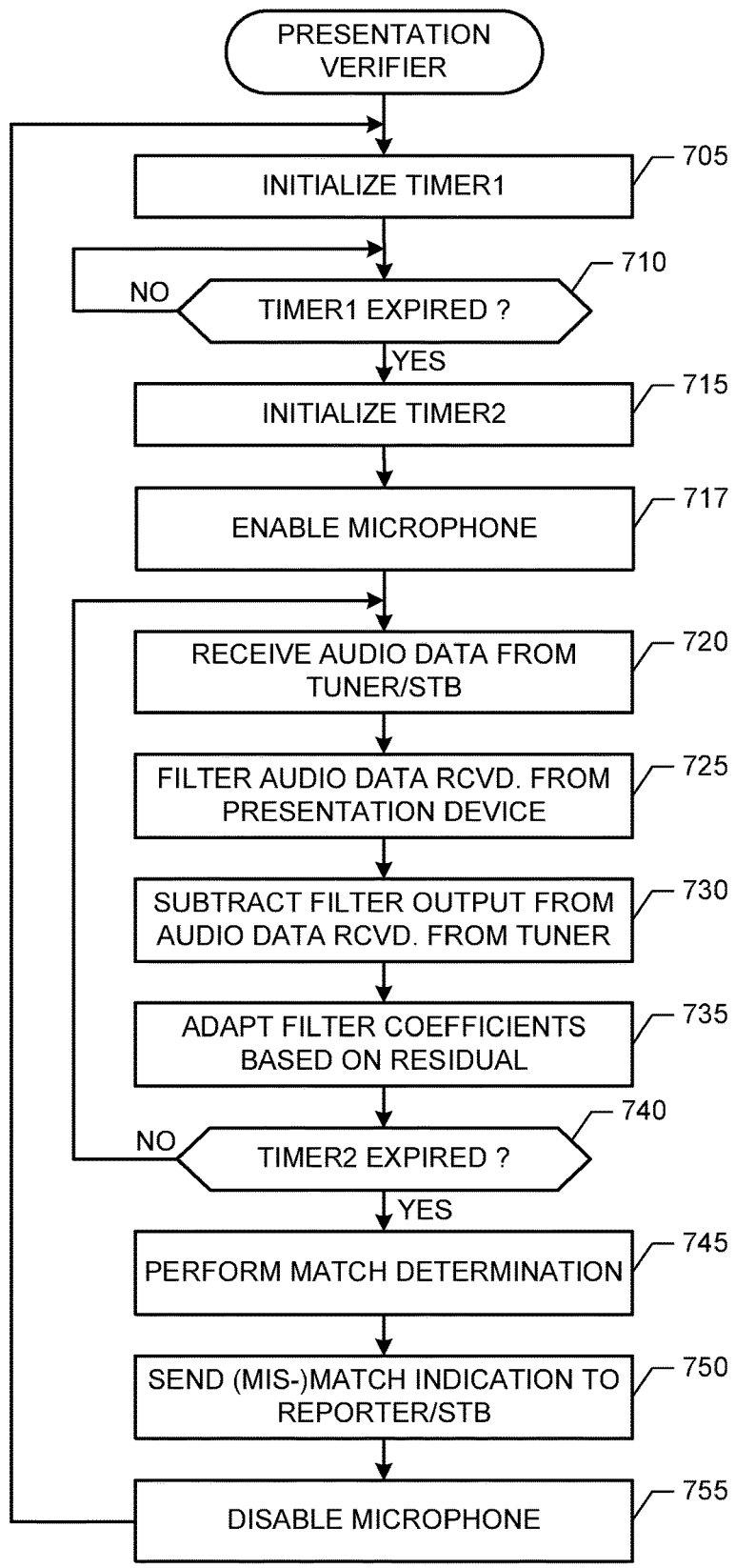
FIG. 7 is a flowchart representative of example machine-accessible instructions that may be executed by, for example, a processor to implement the example presentation verifiers of FIGS. 2, 3 and/or 4.
Figure 8:
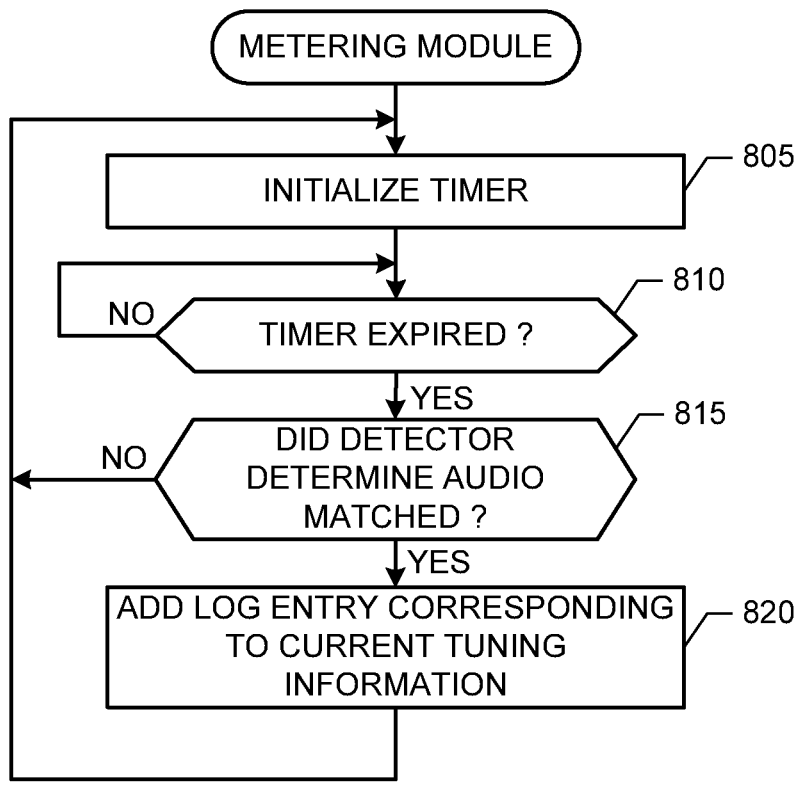
FIG. 8 is a flowchart representative of example machine-accessible instructions that may be executed by, for example, a processor to implement the example metering module of FIGS. 2 and 3.

FIG. 7 illustrates example machine-accessible instructions that may be executed to implement the example presentation verifier 205 of FIGS. 2-4. FIG. 8 illustrates example machine-accessible instructions that may be executed to implement the example metering module 245 of FIGS. 2 and 3. A processor, a controller and/or any other suitable processing device may be used and/or programmed to execute the example machine-accessible instructions of FIGS. 7 and 8. For example, the machine-accessible instructions of FIGS. 7 and 8 may be embodied in coded instructions stored on a tangible computer-readable medium such as a flash memory, a CD, a DVD, a floppy disk, a ROM, a RAM, a PROM, an EPROM, and/or an EEPROM, an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of computer-readable media. Machine-readable instructions comprise, for example, instructions and data that cause a processor, a computer and/or a machine have a processor to perform one or more particular processes. Alternatively, some or all of the example machine-accessible instructions of FIGS. 7 and 8 may be implemented using any combination(s) of ASIC(s), PLD(s), FPLD(s), FPGA(s), discrete logic, hardware, firmware, etc. Also, some or all of the example processes of FIGS. 7 and 8 may be implemented manually or as any combination of any of the foregoing techniques, for example, any combination of firmware, software, discrete logic and/or hardware. Further, many other methods of implementing the example operations of FIGS. 7 and 8 may be employed. For example, the order of execution of the blocks may be changed, and/or one or more of the blocks described may be changed, eliminated, sub-divided, or combined. Additionally, any or all of the example machine-accessible instructions of FIGS. 7 and 8 may be carried out sequentially and/or carried out in parallel by, for example, separate processing threads, processors, devices, discrete logic, circuits, etc.

The example machine-accessible instructions of FIG. 7 begin with the example timer 335 of FIG. 3 initializing a first timer duration TIMER1 (block 705). When the first timer duration TIMER1 expires (block 710), the example timer 335 initializes a second timer duration TIMER2 (block 715) and enables the microphone 310 (block 717).

The example delay line 510 (FIG. 5) receives one or more samples of the audio signal $X_c$ from the STB 215 (block 720). The example filter coefficients 515 are applied to the updated delay line 510 to form one or more updated samples of the estimate $X_T$ (block 725). The example subtractor 525 subtracts the updated estimates $X_T$ from one or more new samples of the audio signal $X_d$ to form one or more new samples of the residual signal $X_0$ (block 730). The example coefficient adapter 520 updates the filter coefficients 515 based on the new residual sample values $X_0$ (block 735).

If the second timer duration TIMER2 has not yet expired (block 740), control returns to block 720 to continue processing samples of the audio signals $X_c$ and $X_d$, and updating the filter coefficients 515.

When the second timer duration TIMER expires (block 740), the example thresholder 530 compares a magnitude of the residual signal $X_0$ to a threshold (block 745). As described above, based on the comparison, the example comparator 325 sends an indication 330 representative of whether the media content corresponding to the audio signal $X_c$ was presented at and/or by the media presentation device 210 (block 750). The timer 335 disables the microphone 310 (block 755) and control returns to block 705 to wait for the timer duration TIMER1 to expire again.

The example machine-accessible instructions of FIG. 8 begin with the example metering module 245 initializing a timer with a duration of TIMER (block 805). When the timer expires (block 810), the metering module 245 determines whether the indication 330 indicates that the media content corresponding to the audio signal $X_c$ was presented at the media presentation device (block 815). If the indication 330 indicates that the media content corresponding to the audio signal $X_c$ was presented at the media presentation device (block 815), the metering module 245 adds a log entry corresponding to the current media content being presented (block 820). A log entry may include any desired data such as a timestamp, a program identifier, an audio and/or video code that was embedded in the media signal, a signature of the media signal, a station identifier, metadata, etc. Control then returns to block 805.

If the indication 330 does not indicate that the media content corresponding to the audio signal $X_c$ was presented at the media presentation device (block 815), control returns to block 805 without adding a log entry.

Figure 9:
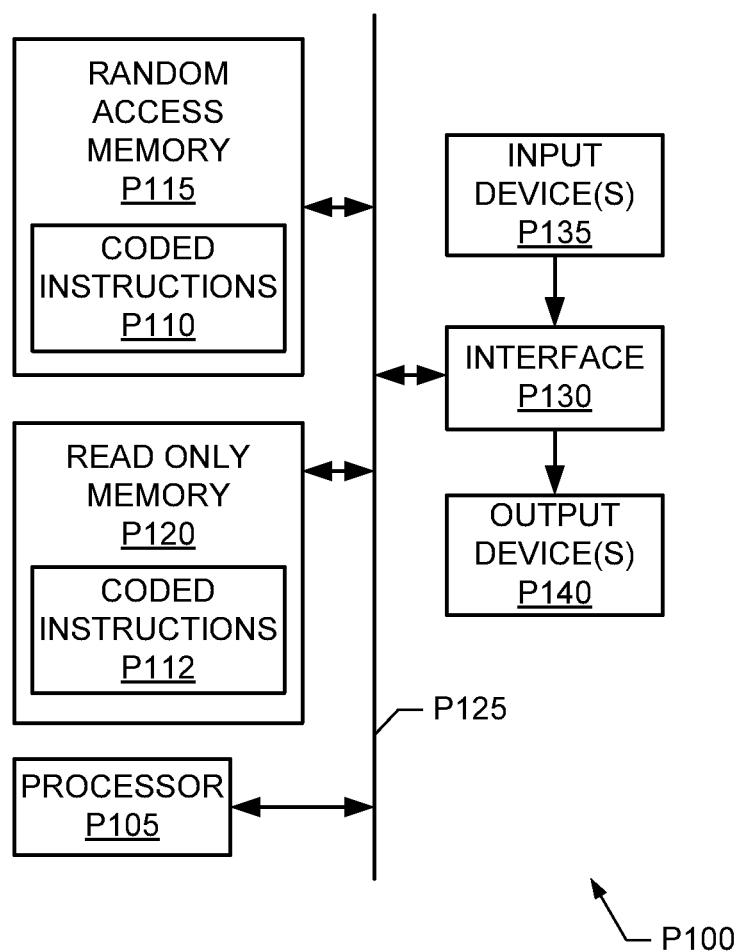
FIG. 9 is a block diagram of an example processor platform that may be used and/or programmed to carry out the example machine-accessible instructions of FIGS. 7 and 8, and/or to implement the example methods and apparatus to verify media content presentation described herein.

FIG. 9 is a schematic diagram of an example processor platform P100 that may be used and/or programmed to implement any of the example apparatus and/or methods to verify presentation of media content disclosed herein. For example, one or more general-purpose processors, processor cores, microcontrollers, etc can implement the processor platform P100.

The processor platform P100 of the example of FIG. 9 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 7 and 8 and/or, more generally, to implement the example presentation verifiers 205 and the example metering modules 245 described herein.

The processor P105 is in communication with any number and/or type(s) of tangible computer-readable storage media (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The input devices P135 may be used to implement the example microphone 310, the example pre-amp 315 and the example ADC 320. The output devices P140 may be used to send the indication 330 to the metering module 245 and/or the STB 215.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An apparatus to generate media presentation information, the apparatus comprising:
a computer-implemented comparator to periodically output a value indicative of whether media selected via a set-top box is presented at a media presentation location, by the comparator comparing a first audio signal associated with media of a media presentation device to ambient audio received in the media presentation location via an audio system associated with the media presentation device;
a computer-implemented privacy protector to facilitate operation of the comparator by periodically preventing the comparator from receiving the ambient audio from a transducer for a first time period based on a granularity of the media presentation information that is to be reported, the granularity based on an amount of time, and enabling the comparator to receive the ambient audio from the transducer after the first time period expires; and
a computer-implemented meter to record presentation of the media based on the output.

2. The apparatus as defined in claim 1, further including the privacy protector to include a timer to facilitate the operation of the comparator by periodically disabling the transducer.

3. An apparatus to generate media presentation information, the apparatus comprising:
a comparator to periodically output a value indicative of whether media selected via a set-top box is presented at a media presentation location by comparing a first audio signal associated with the media to ambient audio received in the media presentation location via an audio system associated with a media presentation device;
a privacy protector to facilitate operation of the comparator by periodically preventing the comparator from receiving the ambient audio from a transducer for a first time period based on a granularity of the media presentation information that is to be reported, the granularity based on an amount of time, and enabling the comparator to receive the ambient audio from the transducer after the first time period expires;
a meter to record presentation of the media based on the output;
a filter to form an estimate of the ambient audio by delaying and attenuating the first audio signal, and
the comparator to compare the estimate of the ambient audio to the ambient audio to form the output,
wherein the filter to have adaptive weights to delay and to attenuate the first audio signal.

4. The apparatus as defined in claim 3, wherein the filter is to set the adaptive weights to zero when the receiving of the ambient audio is enabled.

5. The apparatus as defined in claim 3, wherein the comparator is to form the output by:
subtracting the estimate of the ambient audio from the ambient audio to form a residual signal; and
comparing the residual signal to a threshold.

6. The apparatus as defined in claim 3, wherein the output represents whether the estimate of the ambient audio is present in the ambient audio.

7. A method to generate media presentation information, the method comprising:
comparing, by executing at least one or more first instructions on a processor, via a comparator, a first audio signal associated with media of a media presentation device to ambient audio received in a media presentation location via an audio system associated with a the media presentation device to form an output;
implementing, by executing at least one or more second instructions on a processor, a privacy protocol by periodically disabling the receiving of the ambient audio from a transducer for a first time period based on a granularity of the media presentation information that is to be reported, the granularity based on an amount of time, and enabling the receiving of the ambient audio from the transducer after the first time period expires; and
in response to the output, recording, by executing at least one or more third instructions on a processor, presentation of the media.

8. The method as defined in claim 7, further including:
receiving, at the transducer, the ambient audio in the media presentation location, and
wherein the implementing of the privacy protocol includes:
disabling the transducer from the receiving of the ambient audio;
initializing a timer; and
restarting the transducer receiving the ambient audio when the timer expires.

9. A method to generate media presentation information, the method comprising:
comparing, via a comparator, a first audio signal associated with media of a media presentation device to ambient audio received in a media presentation location via an audio system associated with the media presentation device to form an output;
implementing a privacy protocol by periodically disabling the receiving of the ambient audio from a transducer for a first time period based on a granularity of the media presentation information that is to be reported, the granularity based on an amount of time, and enabling the receiving of the ambient audio from the transducer after the first time period expires;
in response to the output, recording presentation of the media;
forming an estimate of the ambient audio by delaying and attenuating the first audio signal; and
comparing the estimate of the ambient audio to the ambient audio to form the output,
wherein the delaying and the attenuating of the first audio signal includes applying a filter having adaptive weights to the first audio signal.

10. The method as defined in claim 9, further including setting the adaptive weights to zero when the receiving of the ambient audio is enabled.

11. The method as defined in claim 9, wherein the forming of the output includes:
subtracting the estimate of the ambient audio from the ambient audio to form a residual signal; and
comparing the residual signal to a threshold.

12. The method as defined in claim 9, wherein the output represents whether the estimate of the ambient audio is present in the ambient audio.

13. A tangible machine-readable storage device comprising instructions which, when executed, cause a machine to at least:
compare a first audio signal associated with media of a media presentation device to ambient audio received in a media presentation location via an audio system associated with the media presentation device to form an output;

implement a privacy protocol by periodically disabling the receiving of the ambient audio from a transducer for a first time period based on a granularity of media presentation information that is to be reported, the granularity based on an amount of time, and enabling the receiving of the ambient audio form the transducer after the first time period expires; and record presentation of the media based on the output.

14. The machine-readable storage device as defined in claim 13, wherein the machine-readable instructions, when executed, cause the machine to:

receive, at the transducer, the ambient audio in the media presentation location; and implement the privacy protocol by:
 disabling the transducer from the receiving of the ambient audio;
 initializing a timer; and
 restarting the transducer receiving the ambient audio when the timer expires.

15. A tangible machine-readable storage device comprising instructions which, when executed, cause a machine to at least:

compare a first audio signal associated with media to ambient audio received in a media presentation location via an audio system associated with a media presentation device to form an output;

implement a privacy protocol by periodically disabling the receiving of the ambient audio from a transducer for a first time period based on a granularity of media presentation information that is to be reported, the granularity based on an amount of time, and enabling the receiving of the ambient audio from the transducer after the first time period expires;

record presentation of the media based on the output;

form an estimate of the ambient audio by delaying and attenuating the first audio signal;

compare the estimate of the ambient audio to the ambient audio to form the output; and apply a filter having adaptive weights to the first audio signal to delay and to attenuate the first audio signal.

16. The machine-readable storage device as defined in claim 15, wherein the machine-readable instructions, when executed, cause the machine to set the adaptive weights to zero when the receiving of the ambient audio is enabled.

17. The machine-readable storage device as defined in claim 15, wherein the machine-readable instructions, when executed, cause the machine to:

subtract the estimate of the ambient audio from the ambient audio to form a residual signal; and compare the residual signal to a threshold to form the output, the output representing whether the estimate of the ambient audio is present in the ambient audio.

* * * * *